(12) United States Patent
Oh

(10) Patent No.: US 12,743,988 B2
(45) Date of Patent: Sep. 22, 2026

US012743988B2

(54) DATA DRIVER OUTPUTTING SOURCE OUTPUT ENABLE SIGNAL BASED ON MUX CONTROL SIGNALS AND DISPLAY DEVICE INCLUDING THE SAME

(71) Applicant: LG Display Co., Ltd., Seoul (KR)

(72) Inventor: Zonggun Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/219,831

(22) Filed: May 27, 2025

(65) Prior Publication Data

US 2026/0073836 A1 Mar. 12, 2026

(30) Foreign Application Priority Data

Sep. 9, 2024 (KR) ........................ 10-2024-0122036

(51) Int. Cl.
*G09G 3/20* (2006.01)

(52) U.S. Cl.
CPC ..... *G09G 3/2096* (2013.01); *G09G 2310/027* (2013.01); *G09G 2310/0291* (2013.01); *G09G 2310/0297* (2013.01); *G09G 2310/08* (2013.01); *G09G 2320/0233* (2013.01); *G09G 2320/045* (2013.01)

(58) Field of Classification Search
CPC .................................................... G09G 3/2096
USPC .......................................................... 345/214
See application file for complete search history.

(56) References Cited

U.S. PATENT DOCUMENTS

2004/0017341 A1* 1/2004 Maki .................... G09G 3/3688 345/87
2018/0075817 A1* 3/2018 Kim ..................... G09G 3/3688
2023/0206804 A1* 6/2023 Park ......................... G09G 3/20 345/213

FOREIGN PATENT DOCUMENTS

KR 10-2016-0040010 A 4/2016

* cited by examiner

*Primary Examiner* — Long D Pham
(74) *Attorney, Agent, or Firm* — Birch, Stewart, Kolasch & Birch, LLP

(57) ABSTRACT

A display device in some examples can include a display panel on which a plurality of sub-pixels are arranged, a data driver configured to provide a data voltage to the plurality of sub-pixels through a plurality of data lines, and a demultiplexer connected between the data driver and the plurality of data lines. The demultiplexer is configured with a plurality of switching elements controlled by a plurality of mux control signals.

20 Claims, 20 Drawing Sheets

DATA DRIVER OUTPUTTING SOURCE OUTPUT ENABLE SIGNAL BASED ON MUX CONTROL SIGNALS AND DISPLAY DEVICE INCLUDING THE SAME

CROSS-REFERENCE TO RELATED APPLICATION

The present application claims priority to Korea Patent Application No. 10-2024-0122036, filed in the Republic of Korea on Sep. 9, 2024, the entire contents of which is hereby expressly incorporated by reference into the present application.

BACKGROUND

Field

The present disclosure relates to a data driver and a display device including the same.

Discussion of the Related Art

As information society has developed, various types of display devices have been developed. Recently, various display devices such as a liquid crystal display (LCD), a plasma display panel (PDP), and an organic light emitting display (OLED) have been utilized.

A display device can include a display panel on which pixels are disposed, a data driver configured to apply a data voltage to pixels, a gate driver configured to apply a gate signal to pixels, and a timing controller configured to control an operation timing of the data driver and the gate driver. The pixels can receive a data voltage in synchronization with the gate signal and can emit light at luminance corresponding to the data voltage.

In this instance, the data voltage having a predetermined slew rate according to a panel load is output from the data driver. Here, when the panel load increases, the slew rate decreases, and the data voltage can be supplied to the pixels for a sufficient period of time. This can lead to a luminance reduction of the pixels, thereby deteriorating the image quality of the display panel.

SUMMARY OF THE DISCLOSURE

The embodiments of the present disclosure provide a data driver capable of controlling a slew rate of a data voltage according to a turn-on state of switching elements provided in a demultiplexer, and provide a display device including the same data driver.

The embodiments of the present disclosure provide a data driver which controls a slew rate of a data voltage according to whether two or more switching elements of a demultiplexer are turned on simultaneously and a quantity of switching elements which are turned on simultaneously, and provide a display device including the same data driver.

The embodiments of the present disclosure provide a data driver which operates in a high-impedance mode or a driving mode according to a turn-on state of switching elements provided in a demultiplexer, and provide a display device including the same data driver.

One or more embodiments of the present disclosure can provide a display device, including: a display panel on which a plurality of sub-pixels are arranged; a data driver configured to provide a data voltage to the plurality of sub-pixels through a plurality of data lines; and a demultiplexer connected between the data driver and the plurality of data lines and configured with a plurality of switching elements controlled by a plurality of mux control signals.

According to aspects of the present disclosure, the data driver can include: an output buffer configured to buffer and output the data voltage; a calculator configured to output a source output enable signal to the switching element in correspondence with at least one among whether turn-on periods of the plurality of mux control signals overlap and a quantity of the overlap; and a switching element configured to output the data voltage received from the output buffer to the data line in response to the source output enable signal.

According to aspects of the present disclosure, the calculator can include: a first calculator configured to perform a logic calculation with respect to the plurality of mux control signals and output a logic signal having a predetermined logic level; and a second calculator configured to select and output one among the plurality of source output enable signals in response to the logic signal.

According to aspects of the present disclosure, the first calculator can be configured to output the logic signal of n-bit (n is a natural number) corresponding to a quantity of the mux control signals in a turn-on level when at least two mux control signals among the plurality of mux control signals are in the turn-on level.

According to aspects of the present disclosure, the second calculator can be configured to generate a selection signal through a digital calculation processing with respect to the logic signal of n-bit, and output one among the plurality of source output enable signals which corresponds to the selection signal.

According to aspects of the present disclosure, the first calculator can include: a first logic gate group configured to compare the plurality of mux control signals with one another sequentially and output a logic high signal when all the compared mux control signals are in a high level; and a second logic gate group configured to output a first logic signal in a high level when at least one among the logic signals output from the first logic gate group is the logic high signal and output a second logic signal in a high level of the logic high signal when at least two among the logic signals output from the first logic gate group are the logic high signals.

According to aspects of the present disclosure, the first logic gate group can include: an AND gate configured to receive two mux control signals among the plurality of mux control signals and output the logic high signal when all the two received mux control signals are in the high level.

According to aspects of the present disclosure, the second logic gate group can include: an XOR gate configured to receive two logic signals among logic signals output from the first logic gate group and output the first logic signal in the high level when the received two logic signals have different logic levels; and an AND gate configured to receive two logic signals among the logic signals output from the first logic gate group and output the second logic signal in a high level when at least two among the received two logic signals are the logic high signals.

According to aspects of the present disclosure, the second calculator can include: a digital calculation circuit configured to output a selection signal through digital calculation processing of the first logic signal and the second logic signal; and a source output enable signal selection circuit configured to output one among the plurality of source output enable signals in response to the selection signal.

According to aspects of the present disclosure, the source output enable signal selection circuit can be configured to further receive the first logic signal output from the second logic gate group.

According to aspects of the present disclosure, the first logic gate group can further include: a NOT gate configured to invert a logic level of the plurality of mux control signals and output the inverted signals.

According to aspects of the present disclosure, the switching element can operate in a driving mode or a high-impedance mode in response to the source output enable signal.

According to aspects of the present disclosure, in the driving mode, the switching element can be controlled in a turn-on state when the data voltage is output from the output buffer, and in the high-impedance mode, the switching element can be controlled in a turn-on state after a hold period elapses from a time point when the data voltage is output from the output buffer.

According to aspects of the present disclosure, the switching element can be controlled in a high-impedance mode when the turn-on periods of the plurality of mux control signals do not overlap, and the switching element can be controlled in the driving mode when all the turn-on periods of the plurality of mux control signals overlap.

Another embodiment of the present disclosure can provide a data driver, including: a register unit configured to sample image data applied from an external device and output the image data; a latch unit configured to latch the image data output from the register unit and output the image data in synchronization with a latch output control signal received from an external device; a digital-to-analog converter configured to convert the image data output from the latch unit into a gamma compensation voltage and generate a data voltage; an output buffer configured to output the data voltage received from the digital-to-analog converter and time-dividedly connected to a plurality of data lines; a calculator configured to output a source output enable signal in correspondence with at least one among whether turn-on periods of a plurality of mux control signals received from an external device overlap and a quantity of the overlap; and a buffer switching element configured to output the data voltage received from the output buffer to a data line in response to the source output enable signal.

According to aspects of the present disclosure, the calculator can include: a first calculator configured to perform a logic calculation with respect to the plurality of mux control signals and output a logic signal having a predetermined logic level; and a second calculator configured to output one among the plurality of source output enable signals in response to the logic signal.

According to aspects of the present disclosure, the first calculator can be configured to output the logic signal of n-bit (n is a natural number) corresponding to a quantity of the mux control signals in a turn-on level when at least two mux control signals among the plurality of mux control signals are in the turn-on level.

According to aspects of the present disclosure, the second calculator can be configured to generate a selection signal through digital calculation processing with respect to the logic signal of n-bit, and select and output one among the plurality of source output enable signals which corresponds to the selection signal.

According to aspects of the present disclosure, the first calculator can include: a first logic gate group configured to compare the plurality of mux control signals with one another sequentially and output a logic high signal when all the compared mux control signals are in a high level; and a second logic gate group configured to output a first logic signal in a high level when at least one among the logic signals output from the first logic gate group is the logic high signal and output a second logic signal in a high level of a logic high signal when at least two among the logic signals output from the first logic gate group are the logic high signals.

According to aspects of the present disclosure, the second calculator can include: a digital calculation circuit configured to output a selection signal through digital calculation processing of the first logic signal and the second logic signal; and a source output enable signal selection circuit configured to output one among the plurality of source output enable signals in response to the selection signal.

According to aspects of the present disclosure, the source output enable signal selection circuit can be configured to further receive the first logic signal output from the second logic gate group.

A data driver and a display device including the same according to embodiments of the present disclosure can improve a slew rate of a data voltage output from a data driver by controlling an operation mode of a data driver according to an operation state of switching elements provided in a demultiplexer.

A data driver and a display device including the same according to embodiments of the present disclosure can improve a slew rate of a data voltage output from a data driver by removing influence of interference and noise generated by a demultiplexer, as well as a panel load.

In addition, a data driver and a display device including the same according to embodiments of the present disclosure can improve the image quality and performance of a display panel by improving a slew rate of a data voltage output from a data driver.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
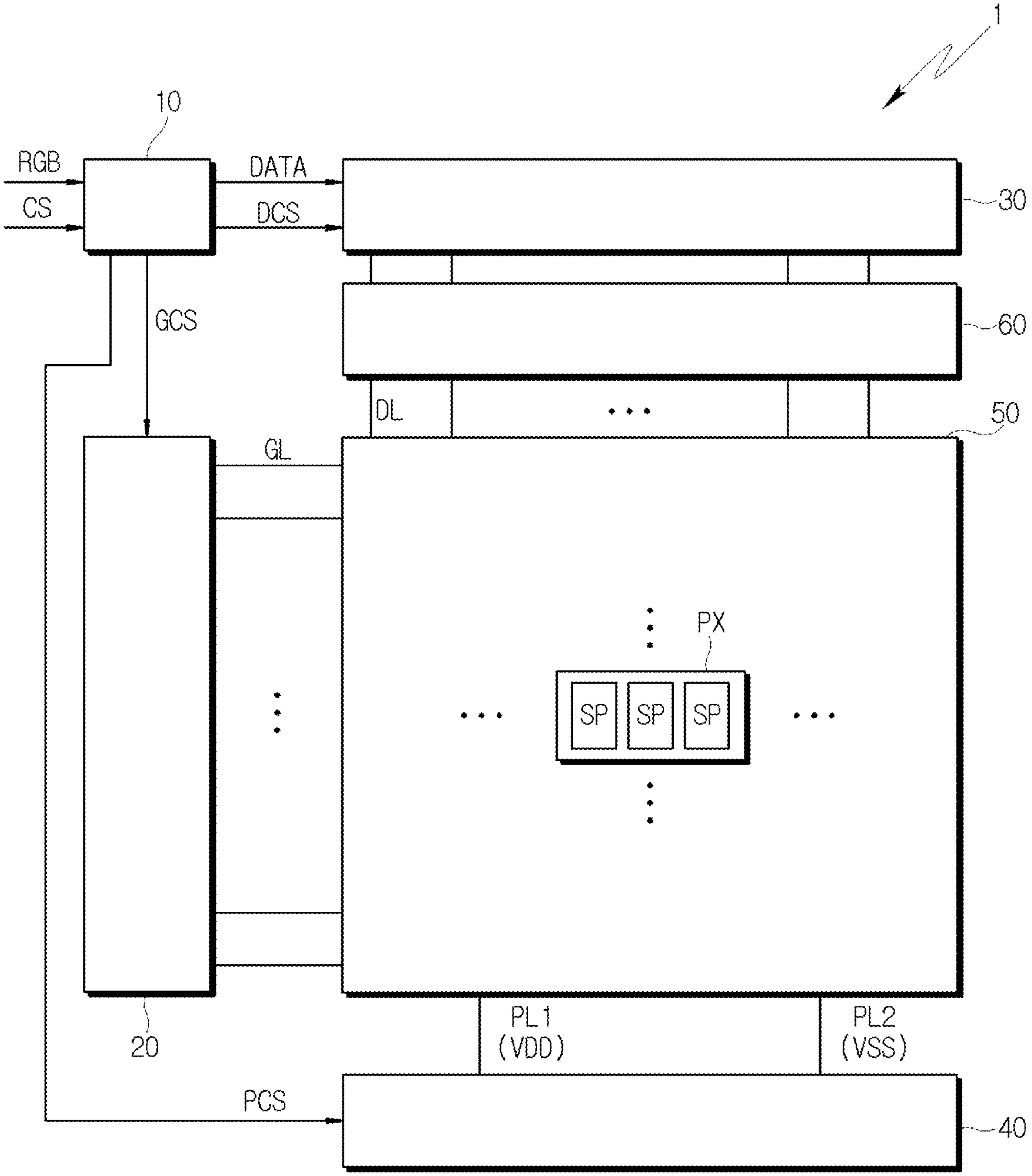
FIG. 1 is a block diagram illustrating a configuration of a display device according to one or more embodiments of the present disclosure.

Hereinafter, embodiments of the present disclosure are described in detail with reference to the accompanying drawings.

The merits and characteristics of the present disclosure and a method for achieving the merits and characteristics will become more apparent from the embodiments of the present disclosure described in detail in conjunction with the accompanying drawings. However, the present disclosure is not limited to the disclosed embodiments, but can be implemented in various different ways. In the below description, when a part is referred to as being "connected to" another part, it can be directly connected to the other part, or it can be electrically connected to the other part with another intervening element inserted therebetween. In addition, parts irrelevant to the present disclosure are omitted in the attached drawings for clarity of description, and like reference numerals denote like elements throughout the attached drawings and the written description.

Features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship. Further, the term "can" encompasses all the meanings and coverages of the term "may" and vice versa.

Also, all the components of each display device or apparatus according to all embodiments of the present disclosure are operatively coupled and configured.

FIG. 1 is a block diagram illustrating a configuration of a display device according to one or more embodiments of the present disclosure.

Referring to FIG. 1, a display device 1 according to one or more embodiments includes a timing controller 10, a gate driver 20, a data driver 30, a power supply unit 40, and a display panel 50.

The timing controller 10 can receive a video signal RGB and a control signal CS from an external device. The video signal RGB can include a plurality of grayscale data. The control signal CS can include, for example, a horizontal synchronization signal, a vertical synchronization signal and a main clock signal.

The timing controller 10 processes the video signal RGB and the control signal CS to be suitable to operational conditions of the display panel 50, and can generate and output image data DATA, a gate control signal GCS, a data control signal DCS, and a power supply control signal PCS. The data control signal DCS can include, for example, a source output enable signal, a latch output control signal, and the like.

The gate driver 20 can be connected to pixels PX of the display panel 50 through a plurality of gate lines GL. The gate driver 20 can generate gate signals based on the gate control signal GCS output from the timing controller 10. The gate driver 20 can provide the generated gate signals to the pixels PX through a plurality of gate lines GL.

The data driver 30 can be connected to the pixels PX of the display panel 50 through a plurality of data lines DL. The data driver 30 can generate data voltages based on image data DATA and data control signals DCS output from the timing controller 10. The data driver 30 can provide the generated data voltages to the pixels PX through the plurality of data lines DL. The data voltages can be applied to the pixels PX in a pixel column selected by a gate signal. To this end, the data driver 30 can supply the data voltages to the plurality of data lines DL for synchronization with the gate signal.

The data driver 30 can include at least one source drive IC. The source drive IC can be mounted in a flexible film in a chip-on-film (COF) or chip-on-plastic (COP) manner to be connected to one side of the display panel 50.

The power supply unit 40 can be connected to the pixels PX of the display panel 50 through a plurality of power lines PL1 and PL2. The power supply unit 40 can generate a driving voltage to be provided to the display panel 50 based on the power supply control signal PCS. The driving voltage can include a high potential driving voltage VDD and a low potential driving voltage VSS. The power supply unit 40 can provide the generated driving voltages VDD and VSS to the pixels PX through corresponding power lines PL1 and PL2.

On the display panel 50, a plurality of pixels PX can be disposed. Each of the pixels PX can include one or more sub-pixels SP. For example, as illustrated, the pixel PX can include a plurality of sub-pixels SP. The sub-pixels SP can be disposed in a matrix form on the display panel 50.

Each of the sub-pixels SP can be electrically connected to a gate line and a data line corresponding thereto. The sub-pixels SP can emit light at luminance corresponding to a data voltage supplied through the data lines DL.

Each sub-pixel SP can display one color among a first color to a third color. In an embodiment of the present disclosure, each sub-pixel SP can display one color among red, green, and blue. In another embodiment of the present disclosure, each sub-pixel SP can display one color among cyan, magenta and yellow. In various embodiments of the present disclosure, each sub-pixel SP can be configured to display one color among four or more colors. For example, each sub-pixel SP can display one color among red, green, blue, and white.

In an embodiment of the present disclosure, the display device 1 can include a demultiplexer 60 connected between the data driver and the sub-pixels and configured to time-dividedly drive the data lines DL. The demultiplexer 60 connects each output channel of the data driver 30 to two or more data lines DL. In addition, the demultiplexer 60 can reduce a quantity of channels of the data driver 30 by time-dividedly distributing a data voltage output from the channels of the data driver 30 to the data lines DL.

In an embodiment of the present disclosure, the demultiplexer 60 can include a plurality of switching elements connected between an output channel of the data driver 30 and the data line DL. For example, the demultiplexer 60 can be a 1:n demultiplexer, of which one output channel is connected to i (i is an integer greater than 1 and smaller than m) data lines DL1 to DLm through one switching element.

In FIG. 1, the gate driver 20, the data driver 30, and the demultiplexer 60 are illustrated to be separate components from the display panel 50, however, at least one among the gate driver 20, the data driver 30, and the demultiplexer 60 can be configured in an In-Panel manner of integrating into the display panel 50. For example, the gate driver 20 can be integrated into the display panel 50 according to a Gate-In-Panel (GIP) manner.

The timing controller 10, the gate driver 20, the data driver 30 and the power supply unit 40 can be configured as separate Integrated Circuits (IC) or at least some parts thereof together can be integrated into and form the Integrated Circuit. For example, the timing controller 10, the data driver 30, and the power supply unit 40 can be configured as a driving chip in an Integrated Circuit (IC) form. The driving chip can be implemented, for example, as a Flexible Printed Circuit Board (FPCB) form.

Figure 2:
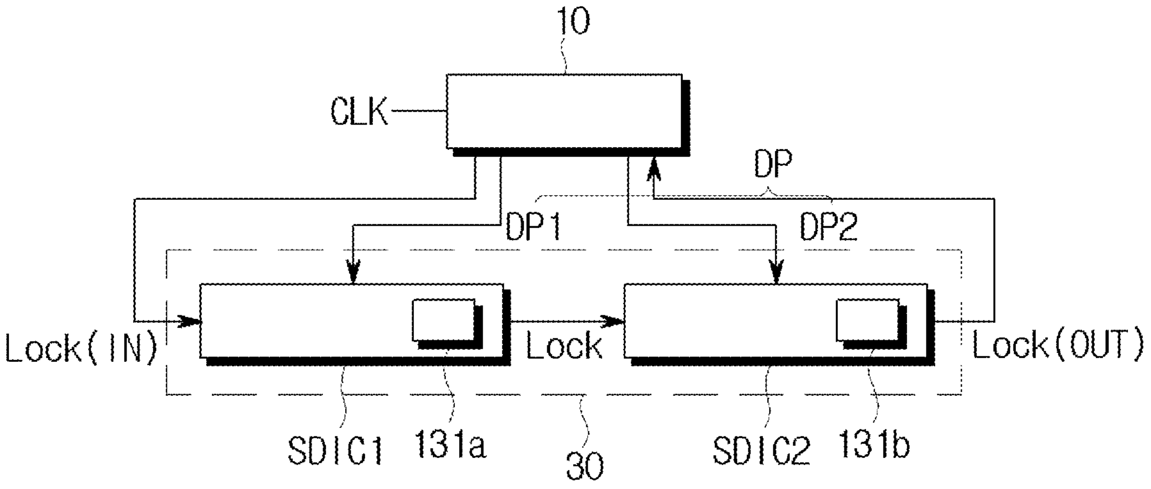
FIG. 2 is a structure illustrating an example of an interface between a timing controller and a data driver in a display device according to an embodiment of the present disclosure.
Figure 3:
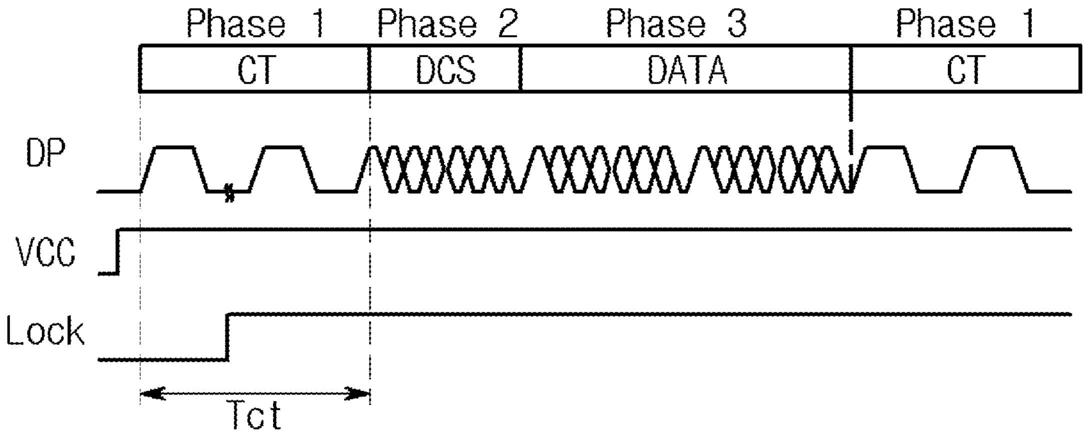
FIG. 3 is a diagram illustrating an example of a signal waveform delivered through an interface between a timing controller and a data driver in a display device according to an embodiment of the present disclosure.

FIG. 2 is a structure illustrating an example of an interface between a timing controller and a data driver in a display device according to an embodiment of the present disclosure, and FIG. 3 is a diagram illustrating an example of a signal waveform delivered through an interface between a timing controller and a data driver in a display device according to an embodiment of the present disclosure.

Referring to FIGS. 2 and 3 together, the display device 1 (FIG. 1) according to an embodiment of the present disclosure can include the timing controller 10 configured to transmit a plurality of data packets DP, and the data driver 30 configured to receive the plurality of data packets DP transmitted from the timing controller 10.

The timing controller 10 and the data driver 30 can communicate with each other by using an Embedded Point-to-point Interface (EPI). In the EPI standard, the timing controller 10 serializes the data control signal DCS and the image data DATA, inserts clock information into the serial data to convert the serial data into data packets DP. Then, the timing controller 10 transmits the converted data packets DP to the data driver 30 in a point-to-point manner. In this manner, a quantity of transmission lines between the timing controller 10 and the data driver 30 can be reduced and high-speed transmission can be achieved.

The timing controller 10 can transmit the data packets DP1 and DP2 to a corresponding source drive IC SDIC1 and SDIC2 according to a clock signal CLK. When the timing controller 10 transmits the data packet DP, each of one or more source drive ICs SDIC1 and SDIC2 configuring the data driver 30 can receive the data packet DP1 and DP2.

The timing controller 10 can transmit a clock training pattern CT in a first period (Phase 1), transmit the data control signal DCS in a second period (Phase 2), and transmit the image data DATA in a third period (Phase 3). While the data packet DP is transmitted, a driving voltage VCC can be applied to the data driver 30.

The clock training pattern CT is a clock signal for synchronizing the operation timings of the timing controller 10 and the data driver 30 with each other, and can be a square wave signal. The timing controller 10 can transmit the clock training pattern CT to the data driver 30 during a clock training period Tct within a Horizontal Blank Time or a Vertical Blank Time. The timing controller 10 can transmit a lock input signal Lock (IN) together with the clock training pattern CT to the data driver 30.

A clock training can be performed between the timing controller 10 and the data driver 30 through the clock training pattern CT. Clock recovery circuits 131*a* and 131*b* inside each source drive IC SDIC1 and SDIC2 can generate an internal clock based on an EPI clock inside the received clock training pattern CT, and can synchronize the timing controller 10 and the clock with each other.

When a phase and a frequency of the internal clock are fixed stably, each of the source drive IC SDIC1 and SDIC 2 can generate a lock signal Lock in a high level. For example, a first source drive IC SDIC1 can deliver the lock signal Lock to a second source drive IC SDIC2 adjacent thereto. A lock signal Lock generated in the last source drive IC (here, the second source drive IC SDIC2) of the data driver 30 is a lock output signal Lock (OUT) of the data driver 30, and can be transmitted to the timing controller 10. The lock output signal Lock (OUT) can be a feedback signal with respect to a lock input signal Lock (IN).

As such, in the EPI standard, the timing controller 10 and the data driver 30 do not need an additional transmission line for transmitting the clock signal. Therefore, a quantity of a transmission line between the timing controller 10 and the data driver 30 can be reduced.

When a normal lock output signal Lock (OUT) is received from the data driver 30, the timing controller 10 can transmit a data control signal DCS and image data DATA corresponding thereto to the plurality of source drive ICs SDIC1 and SDIC2.

The data control signal DCS can include information instructing start of the data control signal DCS, information instructing a starting position of the image data DATA, information instructing a data packet processing option (for example, a degree of equalization, a reception resistance, and the like), the source output enable signal, and the latch output control signal. In addition, the data control signal DCS can further include information controlling various functions implementable in the data driver 30.

The image data DATA can include a plurality of grayscale data corresponding to an image to be displayed in the display panel 50.

Figure 4:
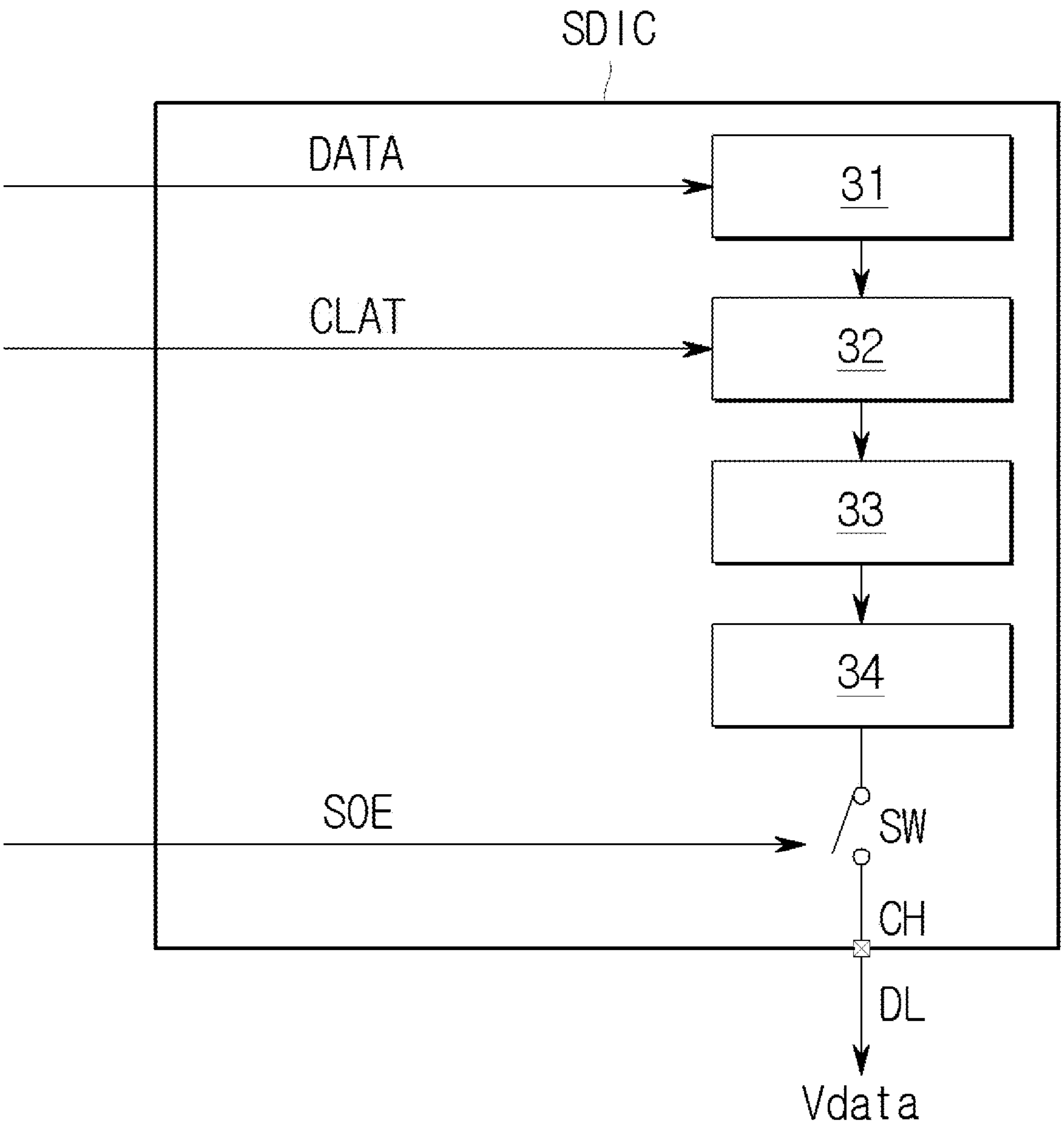
FIG. 4 is a block diagram illustrating a configuration of a source drive IC according to a first embodiment of the present disclosure.

FIG. 4 is a block diagram illustrating a configuration of a source drive IC according to a first embodiment of the present disclosure.

Referring to FIG. 4, the data driver or the source drive IC SDIC can include a register unit 31, a latch unit 32, a digital-to-analog converter 33, an output buffer 34, and a buffer switching element SW.

The register unit 31 can sample bits of the image data DATA received from the timing controller 10 (FIG. 1) sequentially, and output the sampled bits.

The latch unit 32 can latch the image data received from the register unit 31, and simultaneously output bits of the image data DATA in synchronization with a latch output control signal CLAT received from the timing controller 10.

In an embodiment of the present disclosure, the latch unit 32 can be provided in plural number. In such an embodiment of the present disclosure, the plurality of latch units 32 can be connected in series.

The digital-to-analog converter 33 converts the image data received from the latch unit 32 into a gamma voltage, and generates the data voltage Vdata.

The output buffer 34 can buffer a data voltage Vdata output from the digital-to-analog converter 33, and amplify and output the buffered data voltage Vdata. An output terminal of the output buffer 34 can be connected to a buffer switching element SW being turned on/off in response to a source output enable signal SOE.

The buffer switching element SW is connected between the output buffer 34 and the data line DL. The buffer switching element SW may, for example, output a data voltage Vdata output from the output buffer 34 to the data line DL through a channel CH, in synchronization with a falling edge of the source output enable signal SOE.

Figure 5:
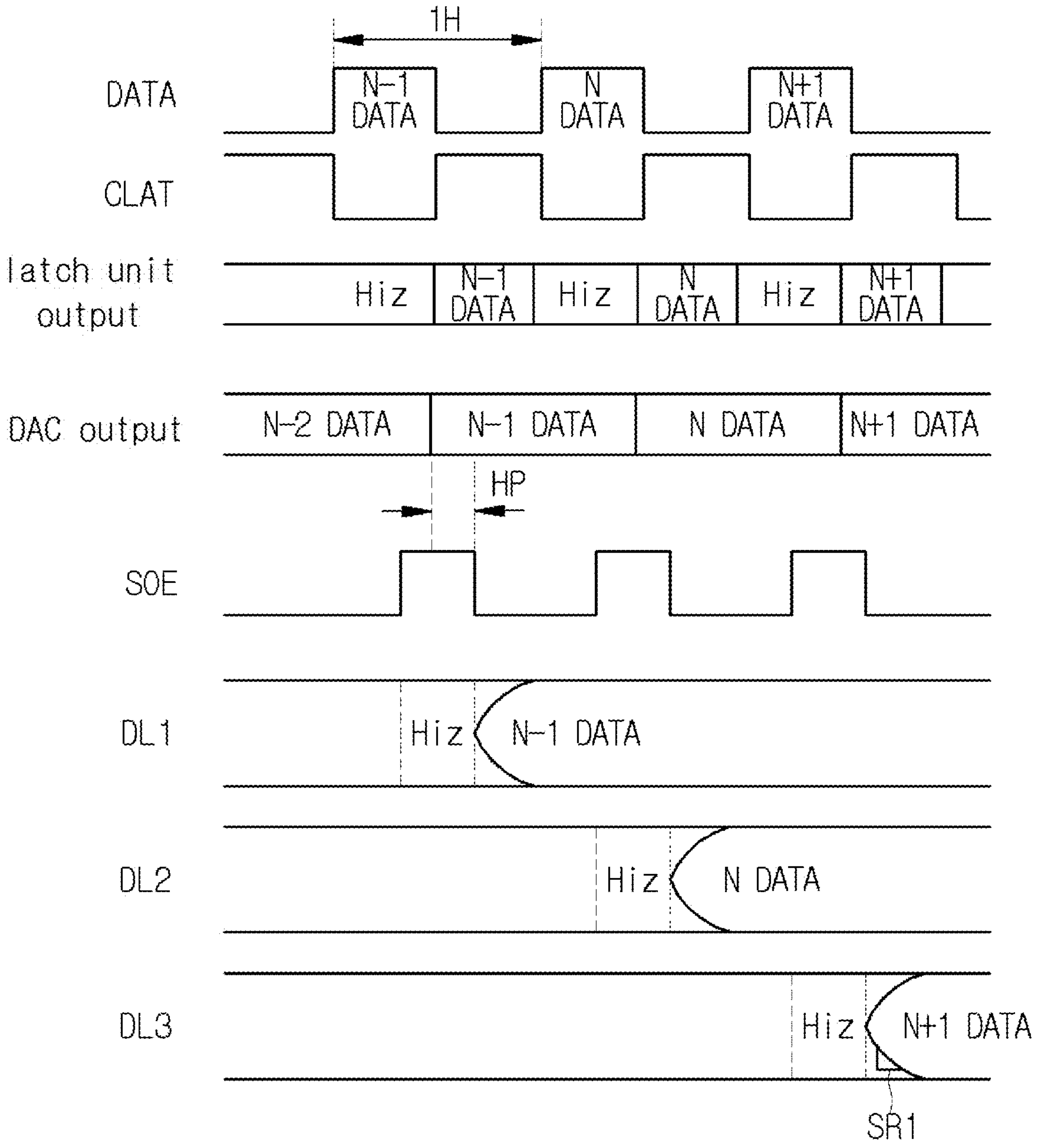
FIG. 5 is a diagram illustrating an example of an input/output signal of a source drive IC in a high-impedance mode.
Figure 6:
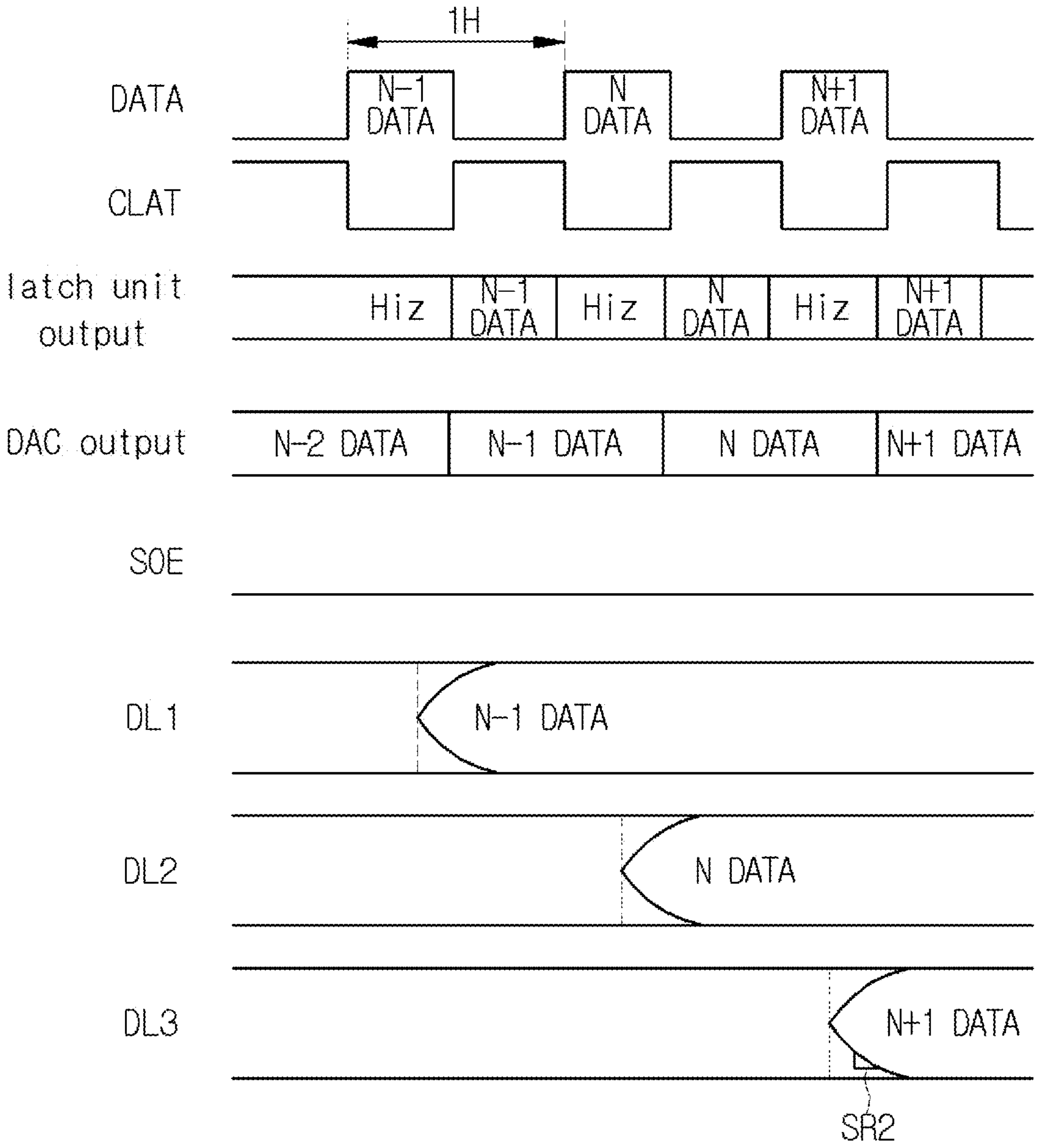
FIG. 6 is a diagram illustrating an example of an input/output signal of a source drive IC in a driving mode.

FIG. 5 is a diagram illustrating an example of an input/output signal of the source drive IC in a high-impedance mode. FIG. 6 is a diagram illustrating an example of an input/output signal of the source drive IC in a driving mode.

First, referring to FIGS. 4 and 5 together, the source drive IC SDIC can receive data N−1 DATA to N+1 DATA and a data control signal DCS (FIG. 3) from the timing controller 10 (FIG. 1). The data control signal DCS can include the latch output control signal CLAT which controls an output timing of the latch unit 32, and the source output enable signal SOE which controls an output timing of the output buffer 34.

The latch output control signal CLAT can control an output timing of the latch unit 32. The latch output control signal CLAT can control the output timing of the latch unit 32 in each of the source drive IC SDIC to be shorter than one horizontal period 1H. The latch output control signal CLAT can include a pulse generated in a cycle of one horizontal period 1H. For example, a cycle of the latch output control signal CLAT can be one horizontal period 1H.

The latch unit 32 can latch the image data N−1 DATA to N+1 DATA received from the register unit 31, and simultaneously output bits of the image data N−1 DATA to N+1 DATA in synchronization with the latch output control signal CLAT. For example, the latch unit 32 can output the image data N−1 DATA to N+1 DATA in synchronization with a rising edge of the latch output control signal CLAT, and stop outputting the image data N−1 DATA to N+1 DATA in synchronization with a falling edge thereof. While the image data N−1 DATA to N+1 DATA is not output, an output signal of the latch unit 32 gets into a high-impedance Hiz state.

The image data N−1 DATA to N+1 DATA output from the latch unit 32 is converted by the digital-to-analog converter DAC 33 to be output as the data voltage Vdata. The output buffer 34 can amplify the data voltage Vdata input from the DAC 33 and output the amplified data voltage Vdata.

The data voltage Vdata output from the output buffer 34 can be output to the data line DL through a channel CH when the buffer switching element SW is turned on. Turning on/off of the buffer switching element SW can be controlled by the source output enable signal SOE.

The source output enable signal SOE can control an output timing of the output buffer 34. In more detail, the source output enable signal SOE can control a timing in which the data voltage Vdata output from the output buffer 34 is to be output to the data line DL through the channel CH, by controlling the on/off timing of the buffer switching element SW. The source output enable signal SOE can control the output timing of the output buffer 34 in each of the source drive IC SDIC to be shorter than the one horizontal period 1H.

The buffer switching element SW is turned on or off in response to the source output enable signal SOE. For example, the buffer switching element SW can be turned on in response to the source output enable signal SOE in a low level, and can be turned off in response to the source output enable signal SOE in a high level.

Therefore, the data voltage output from the output buffer 34 starts being output to the data line DL when the source output enable signal SOE transitions from a high level into a low level, for example, in synchronization with the falling edge of the source output enable signal SOE. At this instance, the data voltage Vdata having a predetermined slew rate can be output by a panel load. As a result, the data voltage Vdata can reach a required voltage after elapse of a predetermined delay time from a time point of starting the output.

In an embodiment of the present disclosure, the buffer switching element SW can be controlled in a high-impedance mode or a driving mode.

Referring to FIG. 5, in the high-impedance mode, the buffer switching element SW is controlled in a turn-on state from a time point when a predetermined hold period HP elapses based on a time point when the data voltage Vdata is output from the output buffer 34. For example, when the data voltage Vdata is output from the output buffer 34, the source output enable signal SOE can be in a high level state. When the source output enable signal SOE is in the high level state, the buffer switching element SW is turned off, and an output node of the output buffer 34 is floated and gets into the high-impedance state. The source output enable signal SOE can transition into a low level after elapse of the hold period HP. The buffer switching element SW can be turned on in synchronization with the falling edge of the source output enable signal SOE, and the data voltage Vdata output from the output buffer 34 can be output to the data line DL1, DL2, and DL3 through the buffer switching element SW which is turned on. Here, the hold period HP can be controlled by adjusting a pulse width of the source output enable signal SOE.

In the driving mode, the buffer switching element SW is controlled in a turn-on state from a time point when the data voltage Vdata is output from the output buffer 34. For example, when the data voltage Vdata is output from the output buffer 34, the source output enable signal SOE can maintain the low level state.

In the driving mode, the data voltage Vdata is affected by the panel load as soon as being output from the output buffer 34. Therefore, the data voltage Vdata has a slew rate SR2 according to the panel load, and can be output according to a predetermined charge characteristic. In the driving mode, when the panel load increases, the slew rate SR2 of the data voltage Vdata is lowered, however, the data voltage Vdata can have a relatively long supply period in the driving mode.

On contrary, in the high-impedance mode, when the data voltage Vdata is output from the output buffer 34, the buffer switching element SW is in a turn-off state, and thus, the data voltage Vdata is not affected by the panel load. At this instance, a signal characteristic of the data voltage Vdata can follow a characteristic of an amplifier configuring the output buffer 34. For example, the data voltage Vdata is output while having a slew rate according to the amplifier characteristic, and thus, can be charged to an output node terminal of the output buffer 34. After that, when the buffer switching element SW is turned on, the charged data voltage Vdata can be output while having a greater slew rate SR1. In such a high-impedance mode, the data voltage Vdata is less affected by the panel load, however, the supply period of the data voltage Vdata can be relatively shortened.

As described above, by controlling the operation mode of the buffer switching element SW, the slew rate of the data voltage Vdata can be controlled to be great or small. The operation mode of the buffer switching element SW can be selected by controlling the source output enable signal SOE. Such an operation mode can be set with respect to each of the output buffer 34, or each of the source drive IC SDIC.

Figure 7:
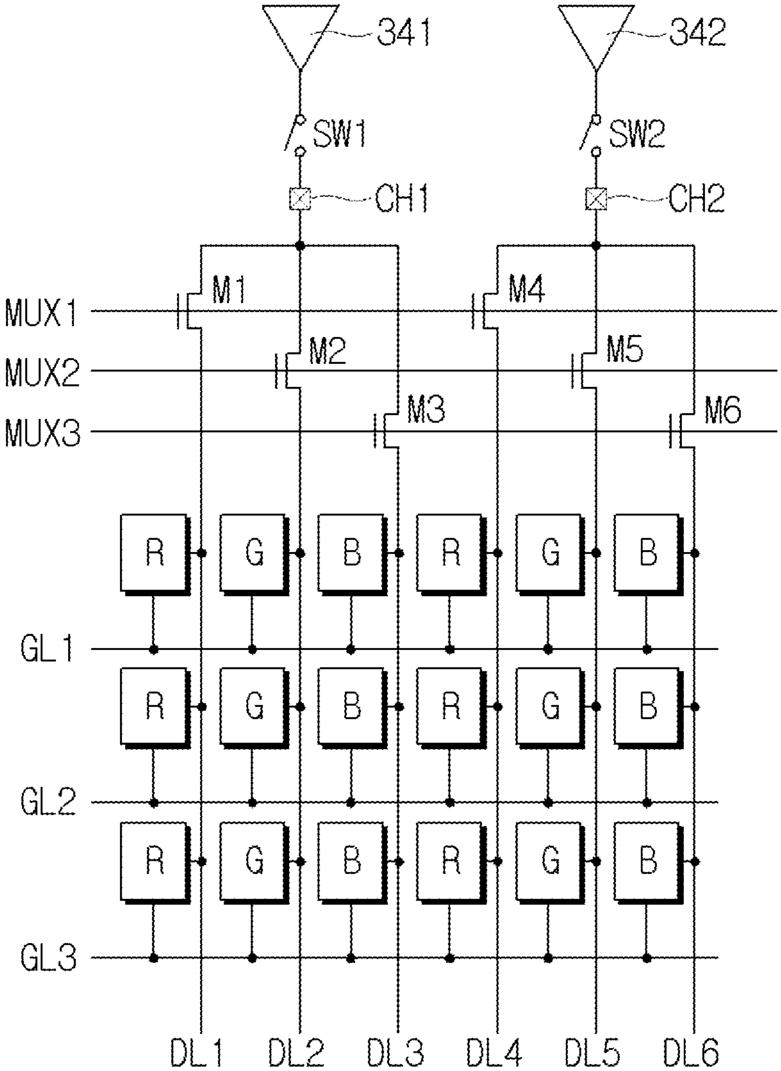
FIG. 7 is a block diagram illustrating a connection relationship between a data driver, a demultiplexer, and a display panel according to an embodiment of the present disclosure.

FIG. 7 is a block diagram illustrating a connection relationship between the data driver, the demultiplexer, and the display panel according to an embodiment of the present disclosure.

Referring to FIG. 7, the data driver 30 (FIG. 1) and/or the source drive IC includes a plurality of output buffers 341 and 342. Each of the output buffers 341 and 342 can output a data voltage through a corresponding channel CH1 and CH2. The buffer switching elements SW1 and SW2, of which turning on/off is controlled according to the source output enable signal SOE, can be further disposed between the output buffers 341 and 342 and the channels CH1 and CH2. In FIG. 7, two output buffers 341 and 342 are illustrated as an example, however, more output buffers can be disposed on a right side.

The demultiplexer 60 (FIG. 1) includes a plurality of switching elements M1 to M6. In FIG. 7, only six switching elements M1 to M6 are illustrated as an example, however, more switching elements can be disposed on a right side.

Each of the switching elements M1 to M6 can be connected to one among the output buffers 341 and 342 of the data driver 30. At this instance, two or more switching elements M1 to M6 can be connected to one output buffer 341 and 342. For example, the first to third switching elements M1 to M3 can be connected to the first output buffer 341, and the fourth to sixth switching elements M4 to M6 can be connected to the second output buffer 342.

Turning on/off of the switching elements M1 to M6 can be controlled through the mux control signals MUX1 to MUX3 provided from the timing controller 10 (FIG. 1) and the like. In more detail, the first switching element M1 and the fourth switching element M4 can be controlled according to the first mux control signal MUX1, the second switching element M2 and the fifth switching element M5 can be controlled according to the second mux control signal MUX2, and the third switching element M3 and the sixth switching element M6 can be controlled according to the third mux control signal MUX3. Here, the switching elements M1 to M6 are controlled according to three mux control signals MUX1 to MUX3, and thus, the demultiplexer 60 can be referred to as a 3MUX structure.

The display panel 50 (FIG. 1) includes the plurality of pixels PX disposed in a matrix form. In FIG. 7, a case in which one pixel PX is configured with three sub-pixels R, G, and B is taken as an example. For example, the sub-pixels R, G, and B can include a red sub-pixel R, a green sub-pixel G, and a blue sub-pixel B.

Each of the sub-pixels R, G, and B is connected to the data line DL1 to DL6 and the gate line GL1 to GL3 corresponding thereto. In FIG. 7, six data lines DL1 to DL6 are illustrated as an example, however, more data lines can be disposed on the right side. In addition, in FIG. 7, three gate lines GL1 to GL3 are illustrated as an example, however, more gate lines can be disposed on a lower side.

The red sub-pixel R, the green sub-pixel G, and the blue sub-pixel B can be sequentially repeated in one sub-pixel row. The red sub-pixel R, the green sub-pixel G, and the blue sub-pixel B disposed adjacent to one another can form one pixel PX.

In an embodiment of the present disclosure, a sub-pixel R, G, and B having the same color can be disposed in the same sub-pixel column. For example, the red sub-pixels R can be disposed in the first sub-pixel column and the fourth sub-pixel column, the green sub-pixels G can be disposed in the second sub-pixel column and the fifth sub-pixel column, and the blue sub-pixels B can be disposed in the third sub-pixel column and the sixth sub-pixel column. However, the present embodiment is not limited thereto. For example, in various other embodiments of the present disclosure, the sub-pixels having different colors R, G, and B can be disposed in one sub-pixel row according to a predetermined pattern.

The switching elements M1 to M6 of the demultiplexer 60 are connected to input terminals of the data lines DL1 to DL6, respectively. In an embodiment of the present disclosure, the sub-pixels R, G, and B configuring one unit pixel PX can be connected to one output buffer 341 and 342 through the switching elements M1 to M6. For example, the sub-pixels R, G, and B configuring one unit pixel PX can be connected to the first output buffer 341 through the first to third switching elements M1 to M3, and the sub-pixels R, G, and B configuring another unit pixel PX can be connected to the second output buffer 342 through the fourth to sixth switching elements M4 to M6. However, the present embodiment of the present disclosure is not limited thereto.

When the switching element M1 to M6 is turned on according to the mux control signal MUX1 to MUX3, a data voltage can be applied to the data lines DL1 to DL6 connected to the corresponding switching element M1 to M6. In more detail, when the first switching element M1 and the fourth switching element M4 are turned on according to the first mux control signal MUX1, a data voltage can be applied to the sub-pixels R connected to the first and fourth data lines DL1 and DL4. In addition, when the second switching element M2 and the fifth switching element M5 are turned on according to the second mux control signal MUX2, a data voltage can be applied to the sub-pixels G connected to the second and fifth data lines DL2 and DL5. In addition, when the third switching element M3 and the sixth switching element M6 are turned on according to the third mux control signal MUX3, a data voltage can be applied to the sub-pixels B connected to the third and sixth data lines DL3 and DL6.

In an embodiment of the present disclosure, the switching elements M1 to M6 can be configured as a transistor. In an illustrated embodiment of the present disclosure, the switching elements M1 to M6 are an nmos transistor. In such an embodiment, a turn-on level of the mux control signals MUX1 to MUX3 is a high level. However, the present embodiment is not limited thereto. For example, in another embodiment of the present disclosure, the switching elements M1 to M6 are a pmos transistor. In such an embodiment of the present disclosure, a turn-on level of the mux control signals MUX1 to MUX3 is a low level.

Figure 8:
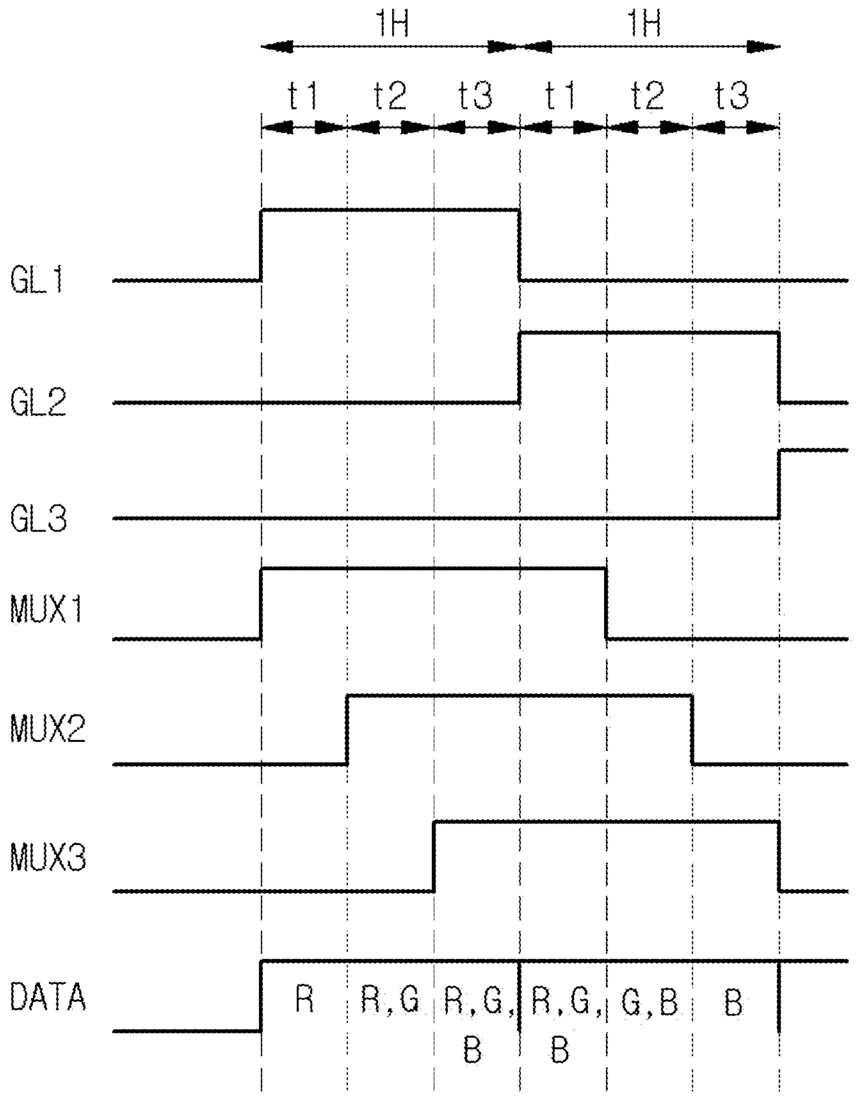
FIG. 8 is a waveform diagram of control and driving signals applied to a display device according to an embodiment of the present disclosure.

FIG. 8 is a waveform diagram of control and driving signals applied to the display device according to an embodiment of the present disclosure.

Referring to FIGS. 7 and 8 together, while the display device 1 (FIG. 1) is driven, a gate signal in a turn-on level is sequentially applied to the gate lines GL1 to GL3. At this instance, each of the gate signals can be applied in a turn-on level during the one horizontal period 1H.

Each of the output buffers 341 and 342 can sequentially output a data voltage with respect to the sub-pixels R, G, and B configuring one pixel PX by time-dividing the one horizontal period 1H. For example, each of the output buffers 341 and 342 can output a data voltage of the first sub-pixel R during a first period t1 of the one horizontal period 1H, can output a data voltage of the second sub-pixel G during a second period t2 thereof, and can output a data voltage of the third sub-pixel B during a third period t3 thereof.

The timing controller 10 (FIG. 1) provides the mux control signal MUX1 to MUX3 so that the switching elements M1 to M6 of the demultiplexer 60 are sequentially turned on during the one horizontal period 1H.

The first mux control signal MUX1 is applied in a turn-on level to the demultiplexer 60 during the first period t1 of the one horizontal period 1H. Then, the first and fourth switching elements M1 and M4 are turned on, and data voltages output from the output buffer 341 and 342 are applied to the first and fourth sub-pixels R, respectively, to be charged to the first and fourth sub-pixels R. At this instance, the data voltages applied to the first and fourth sub-pixels R can correspond to some of a final data voltage corresponding to luminance of emission during an emission period of the first and fourth sub-pixels R thereafter.

The second mux control signal MUX2 is applied in a turn-on level to the demultiplexer 60 during the second period t2 of the one horizontal period 1H. Then, the second and fifth switching elements M2 and M5 are turned on, and data voltages output from the output buffer 341 and 342 are applied to the second and fifth sub-pixels G, respectively, to be charged to the second and fifth sub-pixels G. At this instance, the data voltages applied to the second and fifth sub-pixels G can correspond to some of a final data voltage corresponding to luminance of emission during an emission period of the second and fifth sub-pixels G thereafter.

Meanwhile, the first mux control signal MUX1 maintains a turn-on level during the second period t2. The data voltages output from the output buffer 341 and 342 can be further charged to the first and fourth sub-pixels R.

The third mux control signal MUX3 is applied in a turn-on level to the demultiplexer 60 during the third period t3 of the one horizontal period 1H. Then, the third and sixth switching elements M3 and M6 are turned on, and data voltages output from the output buffer 341 and 342 are applied to the third and sixth sub-pixels B, respectively. At this instance, the data voltages applied to the third and sixth sub-pixels B can correspond to some of a final data voltage corresponding to luminance of emission during an emission period of the third and sixth sub-pixels B thereafter.

Meanwhile, the first and second mux control signals MUX1 and MUX2 maintain a turn-on level during the third period t3. The data voltages output from the output buffer 341 and 342 can be further charged to the first and fourth sub-pixels R, and second and fifth sub-pixels G.

In the above-described manner, the mux control signals MUX1, MUX2, and MUX3 share a turn-on period, and the sub-pixels R, G, and B are driven in a charge share manner in which the sub-pixels are charged by sharing the data voltage with other sub-pixels R, G, and B. Through this manner, the output buffers 341 and 342 can charge the sub-pixels R, G, and B to the desired final data voltage by outputting a lower data voltage, thereby the power consumed by the output buffers 341 and 342 can be reduced.

Meanwhile, in an embodiment in FIG. 8, at least a portion of a turn-on period of the mux control signals MUX1 to MUX3 can overlap. For example, turn-on periods of the first mux control signal MUX1 and the second mux control signal MUX2 can overlap in at least some portion, and turn-on periods of the second mux control signal MUX2 and the third mux control signal MUX3 can overlap in at least some portion. In addition, turn-on periods of the first mux control signal MUX1 and the third mux control signal MUX3 can overlap in at least some portion.

In an illustrated embodiment of the present disclosure, the first mux control signal MUX1 can maintain a turn-on state during the second period t2, and the turn-on period of the first mux control signal MUX1 can overlap the turn-on period of the second mux control signal MUX2. The first mux control signal MUX1 can maintain a turn-on state during the third period t3, and the turn-on period of the first mux control signal MUX1 can overlap the turn-on period of the third mux control signal MUX3. The second mux control signal MUX2 can maintain a turn-on state during the third period t3, and the turn-on period of the second mux control signal MUX1 can overlap the turn-on period of the third mux control signal MUX3.

A sequence in which the first to third mux control signals MUX1 to MUX3 are turned on is not limited to a sequence illustrated in the drawing. In another embodiment of the present disclosure, as illustrated in the second one horizontal period 1H in FIG. 8, the first to third mux control signals MUX1 to MUX3 can be simultaneously turned on, and sequentially turned off during the first period t1.

As the switching elements M1 to M6 are simultaneously turned on, a quantity of the data lines DL1 to DL6 simultaneously connected to the output buffer 341 and 342 increases. For example, while the mux control signals MUX1 to MUX3 overlap, a quantity of the sub-pixels R, G, and B connected to the output buffers 341 and 342 can increase. When the output buffers 341 and 342 are connected to the data lines DL1 to DL6, the data lines DL1 to DL6 and the sub-pixels R, G, and B connected to data lines DL1 to DL6 serve as a panel load. As more mux control signals MUX1 to MUX3 are simultaneously turned on, the panel load can increase more, and performance of the output buffer 341 and 342 can deteriorate.

As described, referring to FIGS. 5 and 6, as the panel load increases, a slew rate of the data voltage can decrease, and it becomes possible to reach the required voltage level after elapse of a certain delay time. When the delay time extends more than a threshold, the image quality deterioration can occur because the sub-pixels R, G, and B cannot emit light at sufficient luminance.

Therefore, in order to regulate the slew rate of the data voltage, the operation mode of the buffer switching elements SW1 and SW2 can be controlled in the driving mode or the high-impedance mode. For example, in order to increase the slew rate of the data voltage, the buffer switching elements SW1 and SW2 can be controlled in the high-impedance mode, or in order to decrease the slew rate of the data voltage, the buffer switching elements SW1 and SW2 can be controlled in the driving mode.

The data voltage can have the higher slew rate in the high-impedance mode. However, as illustrated in FIG. 8, when the switching elements M1 to M6 are simultaneously turned on, because of interference and noise between lines (for example, lines and/or data lines DL1 to DL6 to which the mux control signals MUX1 to MUX3 are applied), the slew rate of the data voltage can rather decrease. Instead, when the switching elements M1 to M6 are simultaneously turned on, because of the low slew rate of the data voltage, the data voltage can require a relatively long supply period. On contrary, when the switching elements M1 to M6 are not simultaneously turned on, the data voltage is output according to the high-impedance mode, thereby the data voltage can have a high slew rate.

Hereinafter, a detailed configuration of the data driver 30 for resolving performance deterioration of the output buffers 341 and 342 and efficiently controlling the operation mode according to the turn-on state of the mux control signals MUX1 to MUX3 will be described.

Figure 9:
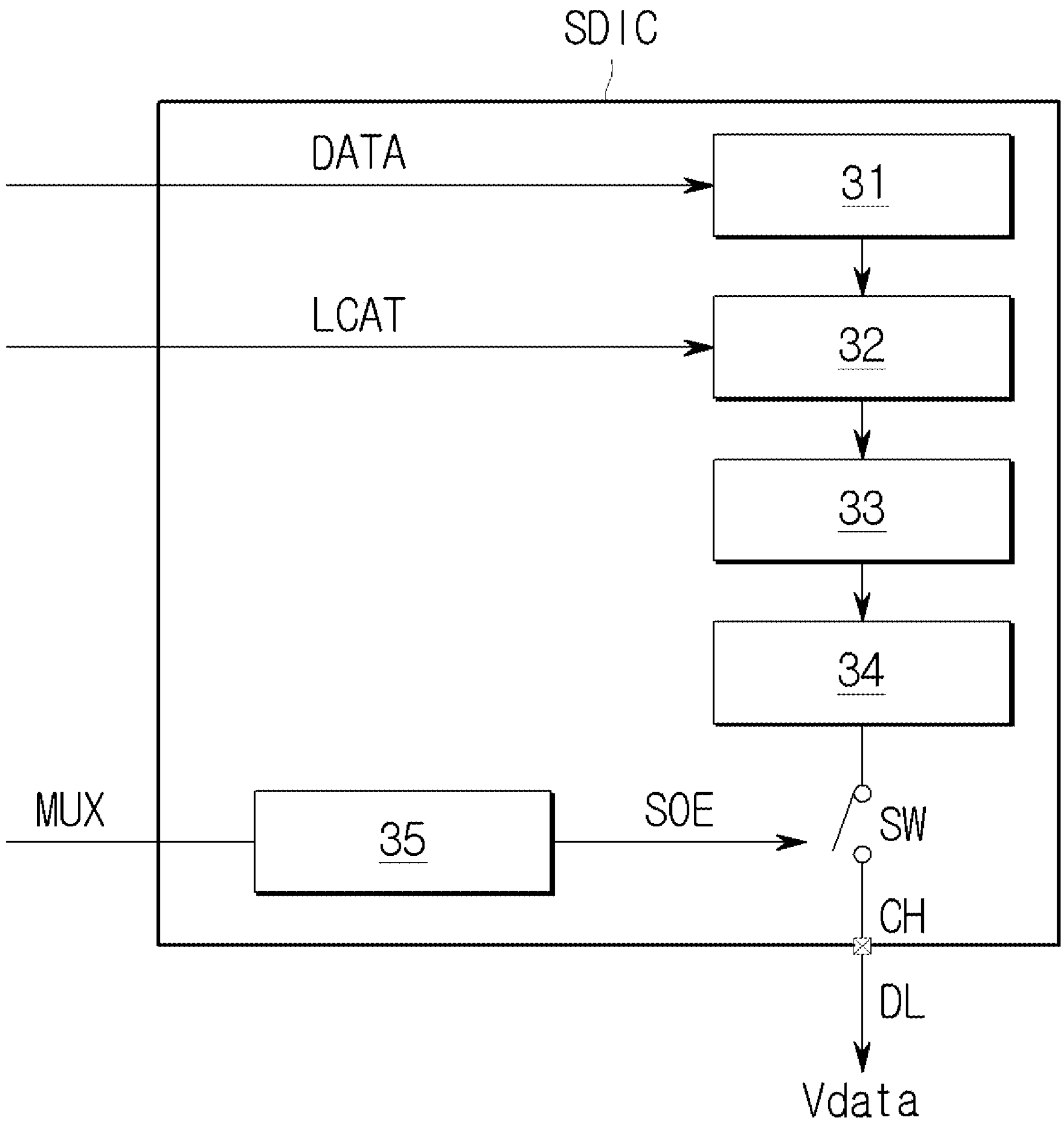
FIG. 9 is a block diagram illustrating a configuration of a data driver according to a second embodiment of the present disclosure.

FIG. 9 is a block diagram illustrating a configuration of a data driver according to a second embodiment of the present disclosure.

Referring to FIG. 9, in comparison with the embodiment in FIG. 4, a data driver 30' according to the second embodiment can further include a calculator 35.

The calculator 35 can generate and output the source output enable signal SOE, which has a predetermined logic level for controlling the operation mode of the switching element SW, from the mux control signals MUX applied from the timing controller 10. In more detail, the calculator 35 can output the source output enable signal SOE which corresponds to different operation modes according to whether the turn-on levels of two or more received mux control signals MUX overlap and a quantity of the overlap.

For example, when at least two of the mux control signals MUX are in a turn-on level, for example, when the turn-on levels of at least two mux control signals MUX overlap, the calculator 35 can select one among a plurality of source output enable signals in correspondence with a quantity of the overlapped mux control signals MUX, and output the source output enable signal SOE.

In an embodiment of the present disclosure, when the turn-on levels of the mux control signals MUX do not overlap, the calculator 35 can output a first source output enable signal. For example, the first source output enable signal can be configured to control the switching element SW in the high-impedance mode. As the switching element SW is controlled in the high-impedance mode, it is possible to increase the slew rate of the data voltage when the turn-on levels of the mux control signals MUX do not overlap.

When the turn-on levels of two mux control signals MUX overlap, the calculator 35 can output a second source output enable signal. For example, the second source output enable signal can be configured to control the switching element SW in the high-impedance mode or the driving mode. For example, the second source output enable signal can be configured to operate the switching element SW in the high-impedance mode, when the slew rate decreases due to the overlapping operation of the mux control signals MUX. Meanwhile, the second source output enable signal can be configured to operate the switching element SW in the driving mode, when the slew rate rather decreases due to distortion generated in the output signal of the output buffer 34 when being operated in the high-impedance mode.

When the turn-on levels of three mux control signals MUX overlap, the calculator 35 can output a third source output enable signal. For example, the third source output enable signal can be configured to operate the switching element SW in the driving mode. Accordingly, it is possible to prevent reduction of the slew rate which occurs because of the distortion of the output signal of the output buffer 34.

As a result, the data driver 30 according to an embodiment of the present disclosure can improve the slew rate of the data voltage output from the output buffer 34 when at least two mux control signals MUX are in a turn-on period, and in particular, can prevent reduction of the slew rate of the data voltage by controlling the operation mode of the switching element SW in consideration of the distortion between the output buffers 34 according to a quantity of simultaneous turn-on periods of the mux control signals MUX1 to MUX3.

Meanwhile, the quantity of the mux control signals MUX1 to MUX3 and the quantity and kinds of the source output enable signal SOE are not limited to the ones described above. Whether to operate the switching element SW in the high-impedance mode or the driving mode according to whether the mux control signals MUX overlap each other and the quantity of the overlap can be variously determined according to the characteristic of the display device 1 (FIG. 1).

Figure 10:
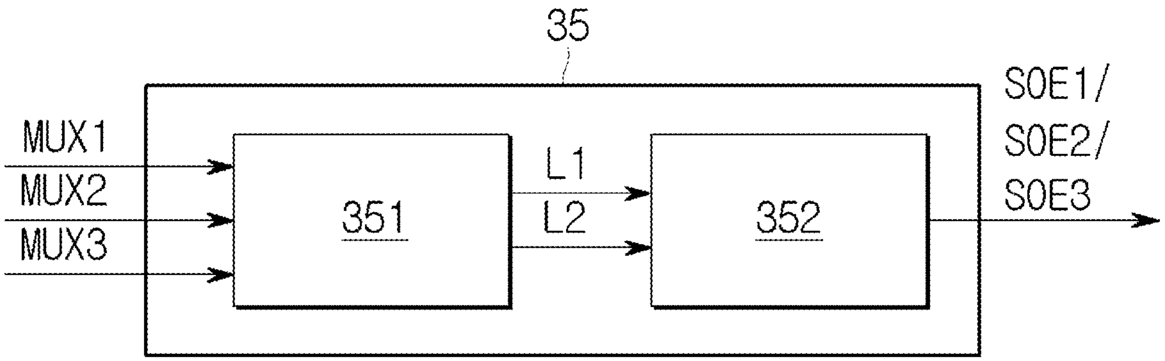
FIG. 10 is a diagram illustrating a configuration of a calculator illustrated in FIG. 9.

FIG. 10 is a diagram illustrating a configuration of the calculator illustrated in FIG. 9.

Referring to FIG. 10, the calculator 35 is configured to receive the mux control signals MUX1 to MUX3. In addition, the calculator 35 can be configured to output the source output enable signal SOE1 to SOE3 from the mux control signals MUX1 to MUX3 through a predetermined logic calculation and a digital calculation. In more detail, the calculator 35 can be configured to output a predetermined source output enable signal SOE1 to SOE3 in correspondence with whether two or more mux control signals MUX1 to MUX3 are in the turn-on level, and the quantity of the mux control signals MUX1 to MUX3 in the turn-on level simultaneously.

The calculator 35 can include a first calculator 351 configured to output a logic signal L1 and L2 by performing a predetermined logic calculation with respect to the mux control signals MUX1 to MUX3; and a second calculator 352 configured to select and output one among the source output enable signals SOE1 to SOE3 in correspondence with the logic signal L1 and L2 output from the first calculator 351.

The first calculator 351 can output a predetermined logic signal L1 and L2 which corresponds to the quantity of the mux control signals MUX1 to MUX3 in the turn-on level simultaneously, when at least two mux control signals among the mux control signals MUX1 to MUX3 are in the turn-on level. The logic signal L1 and L2 can have a value of 0 or 1, but is not limited thereto.

In an embodiment of the present disclosure, the first calculator 351 can output logic signals L1 and L2 of n-bit (n is a natural number) (or, can output n logic signals L1 and L2), but is not limited thereto. For example, when the quantity of the mux control signals MUX1 to MUX3 which are turned on is one, for example, when the turn-on levels of the mux control signals MUX1 to MUX3 do not overlap, the first calculator 351 can output logic signals L1 and L2 of '0' and '0'. When the quantity of the mux control signals MUX1 to MUX3 which are turned on is two, the first calculator 351 can output logic signals L1 and L2 of '1' and '0'. When the quantity of the mux control signals MUX1 to MUX3 which are turned on is three, the first calculator 351 can output logic signals L1 and L2 of 'l' and '1'.

Meanwhile, the quantity of the logic signals L1 and L2 output from the first calculator 351 is not limited to two. The quantity of the logic signals L1 and L2 output from the first calculator 351 can be set variously according to the quantity of the mux control signals MUX1 to MUX3, and/or the configuration of the second calculator 352 which will be described below.

The first calculator 351 can output the logic signals L1 and L2 in series or in parallel. When the first calculator 351 outputs the logic signals L1 and L2 in series, the first calculator 351 and the second calculator 352 are connected through one line, and when the first calculator 351 outputs the logic signals L1 and L2 in parallel, the first calculator 351 and the second calculator 352 can be connected to lines having a quantity corresponding to the quantity of the logic signals L1 and L2 (for example, two).

The first calculator 351 can be configured by including one or more logic gates, but is not limited thereto.

The second calculator 352 can select one among the source output enable signals SOE1 to SOE3 based on the logic signals L1 and L2 output from the first calculator 351, and output the selected one to the switching element SW. When the logic signals L1 and L2 instruct the quantity of the mux control signals MUX1 to MUX3 which are turned on, the second calculator 352 can select one among the source output enable signals SOE1 to SOE3 in correspondence with the quantity of the mux control signals MUX1 to MUX3 which are turned on.

For example, when the logic signals L1 and L2 are '0' and '0', for example, when there is no mux control signals MUX1 to MUX3 of which the turn-on levels overlap, the second calculator 352 can output the first source output enable signal SOE1. When the logic signals L1 and L2 are '1' and '0', for example, the quantity of the mux control signals MUX1 to MUX3 of which the turn-on levels overlap is two, the second calculator 352 can output the second source output enable signal SOE2. When the logic signals L1 and L2 are '1' and '1', for example, the quantity of the mux control signals MUX1 to MUX3 of which the turn-on levels overlap is three, the second calculator 352 can output the third source output enable signal SOE3.

The second calculator 352 can be configured to include a digital calculation circuit capable of selecting one among the source output enable signals SOE1 to SOE3 through a digital calculation of the logic signals L1 and L2, but is not limited thereto.

Meanwhile, the turn-on combination of the mux control signals MUX1 to MUX3 is not limited to the described ones. As more or less mux control signals MUX1 to MUX3 are provided to the demultiplexer 60 (FIG. 7), a form and a quantity of the turn-on combination of the mux control signals MUX1 to MUX3 can change variously. In addition, accordingly, the kinds and quantity of the source output enable signals SOE1 to SOE3 can change variously.

Hereinafter, various embodiments of the configuration of the calculator 35 will be described in more detail.

Figure 11:
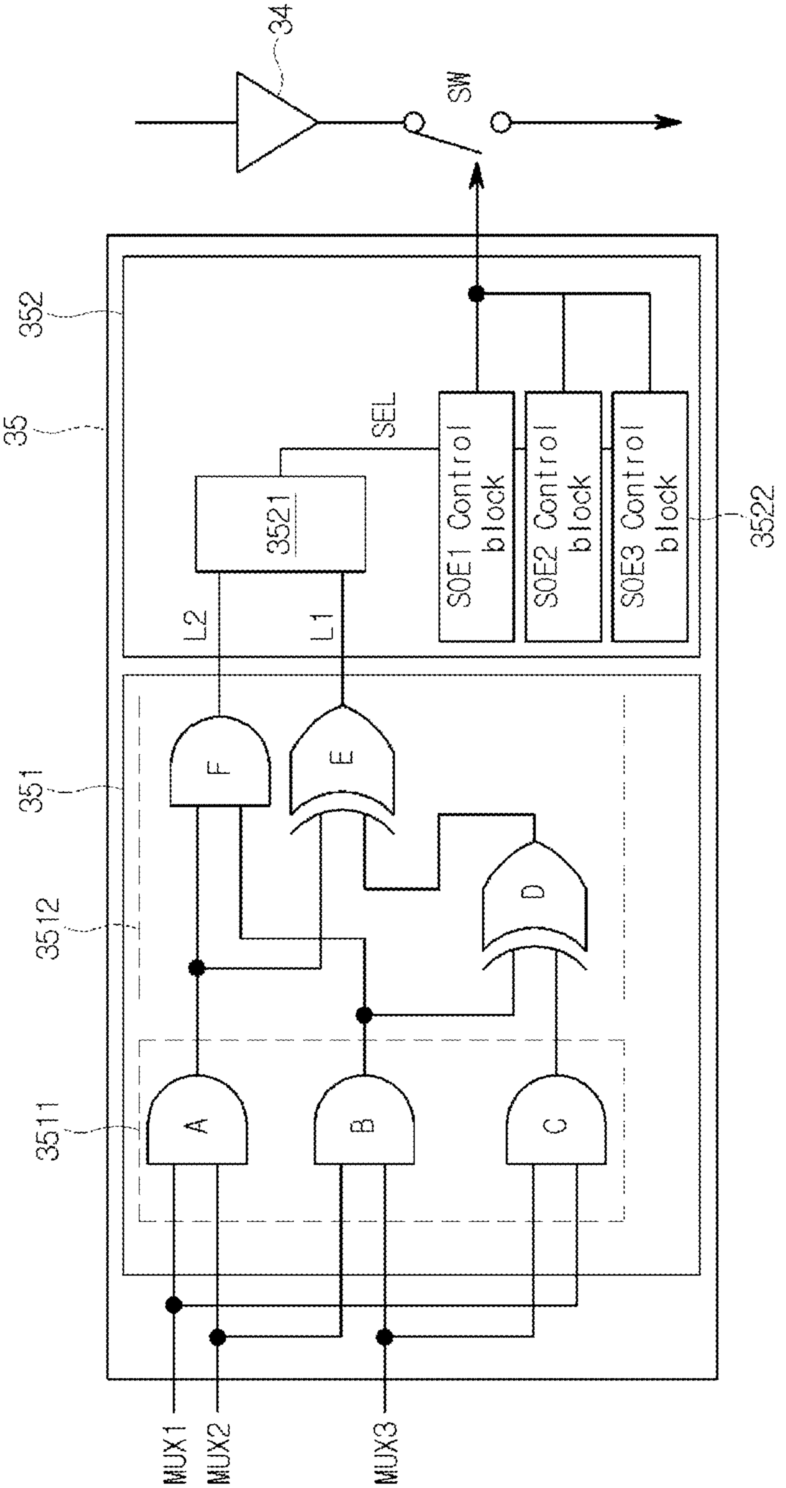
FIG. 11 is a diagram illustrating a configuration of a calculator according to the first embodiment of the present disclosure.
Figure 12:
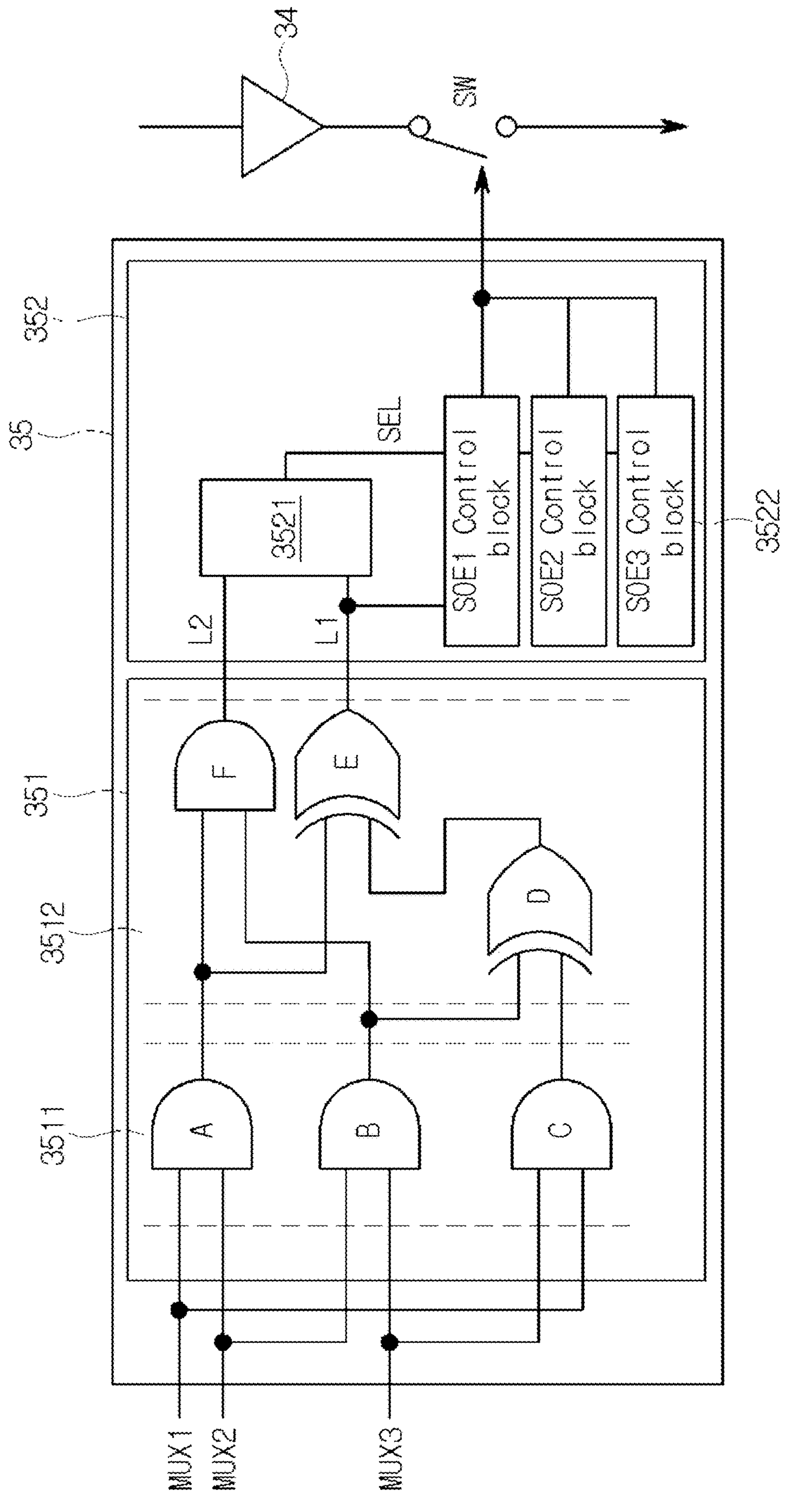
FIG. 12 is a diagram illustrating a configuration of a calculator according to the second embodiment of the present disclosure.
Figure 13:
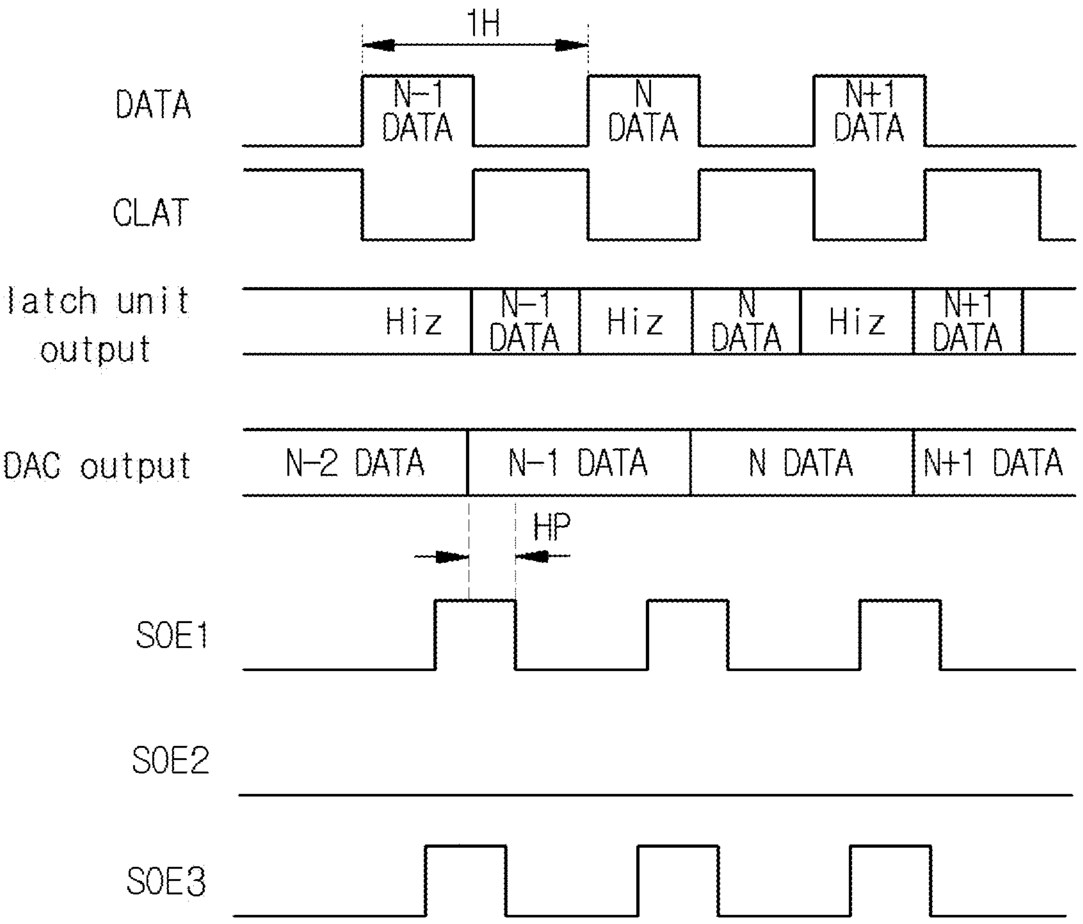
FIG. 13 is a view illustrating waveforms of source enable signals according to an embodiment of the present disclosure.
Figure 14:
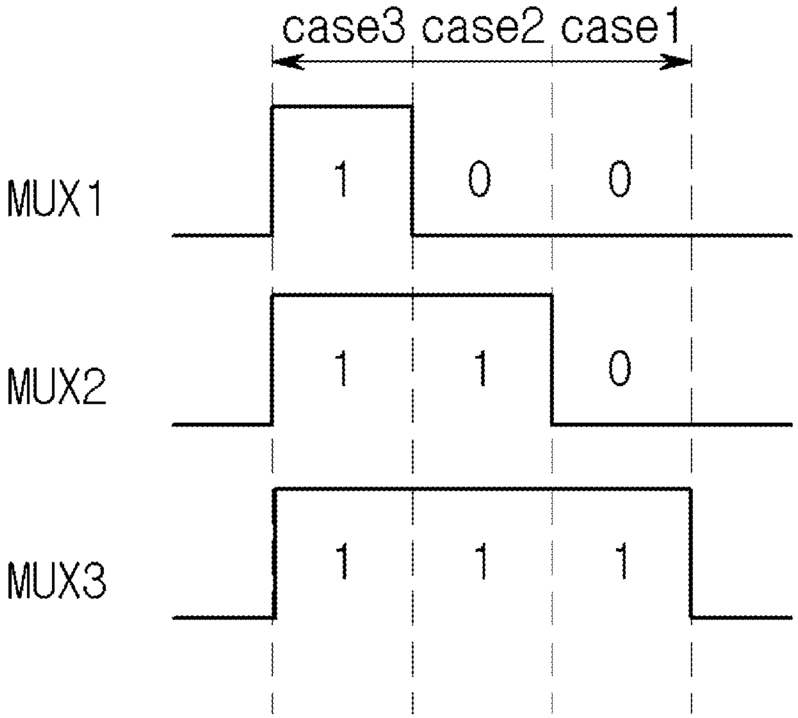
FIGS. 14 to 17 are waveform diagrams illustrating examples of input/output signals of a calculator illustrated in FIGS. 11 and 12.
Figure 15:
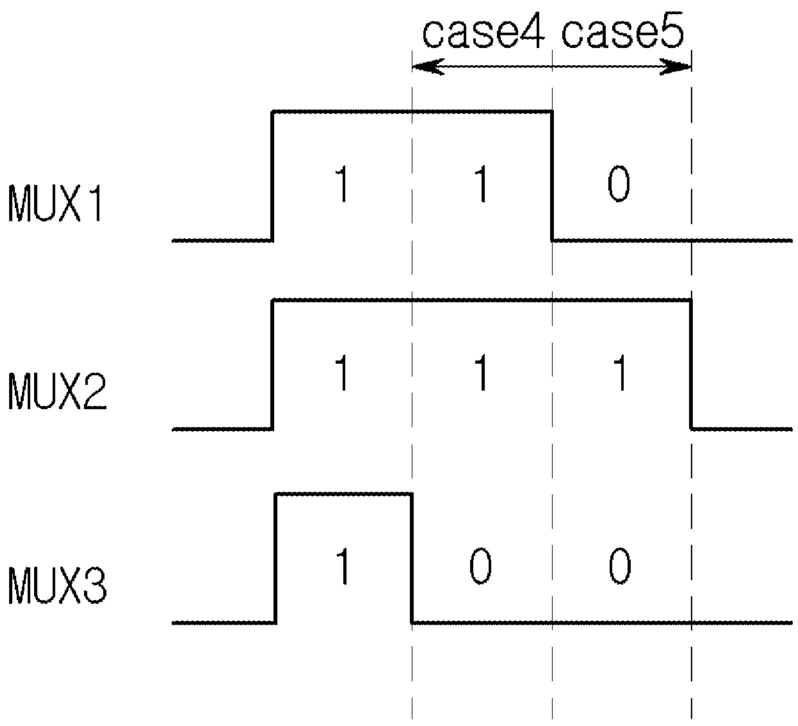
Figure 16:
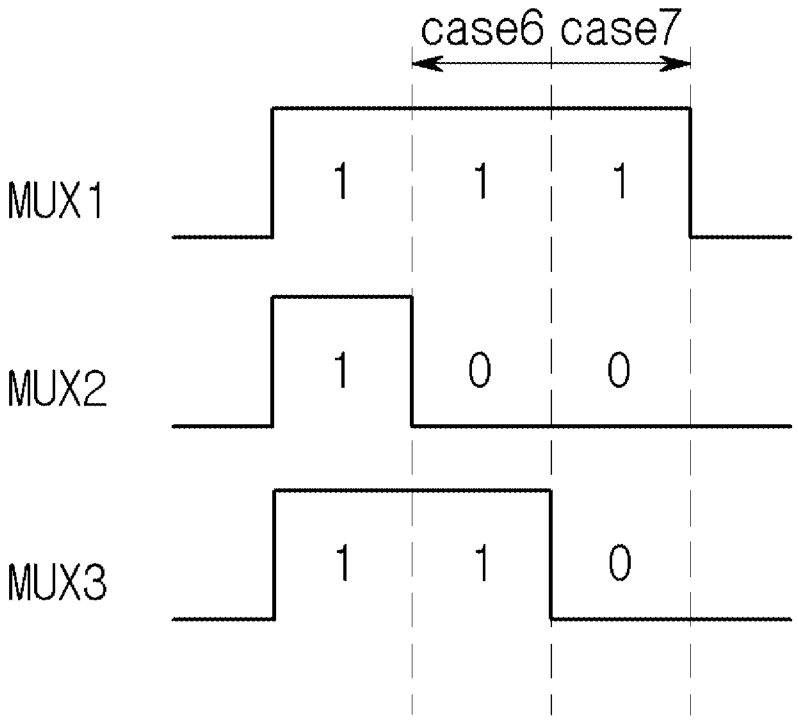
Figure 17:
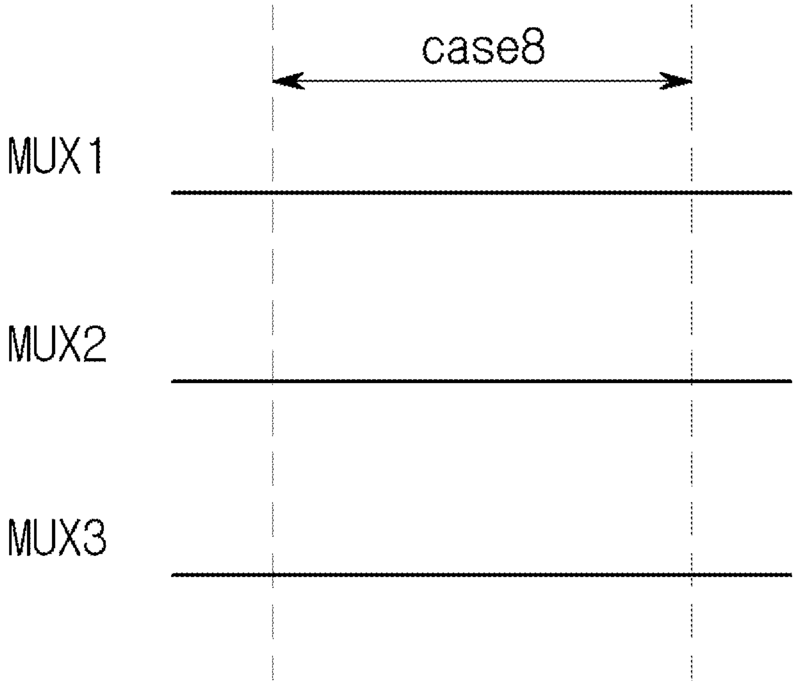

FIG. 11 is a diagram illustrating a configuration of a calculator according to a first embodiment of the present disclosure. FIG. 12 is a diagram illustrating a configuration of a calculator according to a second embodiment of the present disclosure. FIG. 13 is a view illustrating waveforms of the source output enable signals according to an embodiment of the present disclosure.

Referring to FIG. 11, the calculator 35 can include the first calculator 351 configured to output logic signals L1 and L2 according to whether the mux control signals MUX1 to MUX3 overlap each other and the quantity of the overlap; and the second calculator 352 configured to select and output one among the plurality of source output enable signals SOE1 to SOE3 in correspondence with the logic signals L1 and L2.

The first calculator 351 can include a first logic gate group 3511 and a second logic gate group 3512.

The first logic gate group 3511 can be configured such that the first logic gate group 3511 compares the mux control signals MUX1 to MUX3 sequentially, and when all the compared mux control signals MUX1 to MUX3 are in a turn-on level, that is a high level, the first logic gate group 3511 outputs a first logic signal, that is a logic high signal. Such a first logic gate group 3511 can include an AND gate. The AND gate can output a second logic signal, for example, a logic low signal, when at least one of the compared mux control signals MUX1 to MUX3 is not in a turn-on level.

The AND gate can receive two mux control signals among the mux control signals MUX1 to MUX3, and when all the received two mux control signals have a high level, the AND gate can output the logic high signal. In other words, when two mux control signals, which are the comparison targets, have the turn-on level, the AND gate can output the logic high signal.

The AND gate can be provided in plural number so that all the possible combinations with respect to the mux control signals MUX1 to MUX3 can be selected for the logic calculation. When the demultiplexer 60 (FIG. 7) is driven with three mux control signals MUX1 to MUX3, the AND gate can be provided three in number as illustrated.

For example, a first AND gate A receives the first and second mux control signals MUX1 and MUX2, and when all the first and second mux control signals MUX1 and MUX2 are in a high level, the first AND gate A outputs the logic high signal '1', and when not all the first and second mux control signals MUX1 and MUX2 are in a high level, the first AND gate A outputs the logic low signal '0'. A second AND gate B receives the second and third mux control signals MUX2 and MUX3, and when all the second and third mux control signals MUX2 and MUX3 are in a high level, the second AND gate B outputs the logic high signal '1', and when not all the second and third mux control signals MUX2 and MUX3 are in a high level, the second AND gate B outputs the logic low signal '0'. A third AND gate C receives the third and first mux control signals MUX3 and MUX1, when all the third and first mux control signals MUX3 and MUX1 are in a high level, the third AND gate C outputs the logic high signal '1', and when not all the third and first mux control signals MUX3 and MUX1 are in a high level, the third AND gate C outputs the logic low signal '0'.

The second logic gate group 3512 can generate the first and second logic signals L1 and L2 from the logic signals received from the first logic gate group 3511, and output the signals. The second logic gate group 3512 can include one AND gate and a plurality of XOR gates.

Two XOR gates can be configured to output a logic high signal when at least one among the logic signals output from the first logic gate group 3511 is a logic high signal. In other words, when there are the mux control signals MUX1 to MUX3 which are simultaneously turned on, the XOR gate can output a logic high signal.

The XOR gate can be provided in plural number so that the logic calculation with respect to the logic signals can be made possible by selecting all the possible combinations with respect to the logic signals output from the first logic gate group 3511. When the first logic gate group 3511 is configured with three AND gates, the XOR gate can be provided two in number as illustrated.

For example, a first XOR gate D receives the logic signals output from the second and third AND gates B and C, and when the logic signals output from the second and third AND gates B and C have the same logic level, the first XOR gate D outputs the logic low signal '0', and when the logic signals output from the second and third AND gates B and C do not have the same logic level, the first XOR gate D outputs the logic high signal '1'. A second XOR gate E receives the logic signal output from the first XOR gate D and the logic signal output from the first AND gate A, and when the logic signal output from the first XOR gate D and the logic signal output from the first AND gate A have the same logic level, the second XOR gate E outputs the logic low signal '0', and when the logic signal output from the first XOR gate D and the logic signal output from the first AND gate A do not have the same logic level, the second XOR gate E outputs the logic high signal '1'. The logic signal finally output from the second XOR gate E can be output as the first logic signal L1 of the first calculator 351.

The AND gate can output the logic high signal when at least two of the logic signals output from the first logic gate group 3511 have the high level. In other words, when all the mux control signals MUX1 to MUX3 have the turn-on level, the AND gate can output the logic high signal. Reversely, when at least one of the mux control signals MUX1 to MUX3 is not in the turn-on level, the AND gate can output the logic low signal.

When the first logic gate group 3511 is configured with three AND gates, the XOR gate can be provided one in number as illustrated. For example, a fourth AND gate F can receive a logic signal output from the first AND gate A and a logic signal output from the second AND gate B, and when all the received logic signals are in a high level, the fourth AND gate F can output the logic high signal '1', and when not all the received logic signals are in a high level, the fourth AND gate F can output the logic low signal '0'.

The logic signal finally output from the fourth AND gate F can be output as the second logic signal L2 of the first calculator 351.

In FIG. 11, it is illustrated that the fourth AND gate F compares the output signals of the first AND gate A and the second AND gate B, but is not limited thereto. For example, in another embodiment of the present disclosure, the fourth AND gate F can be connected to the second AND gate B and the third AND gate C, or to the third AND gate C and the first AND gate A.

The second calculator 352 can include a digital calculation circuit 3521 and a source output enable signal selection circuit 3522.

The digital calculation circuit 3521 receives the logic signals L1 and L2 output from the second logic gate group 3512, and can output a selection signal SEL by performing digital calculation processing with respect to the logic signals L1 and L2.

The digital calculation circuit 3521 can receive one among the logic signals L1 and L2 output from the first calculator 351 as an upper bit and the remaining other as a lower bit. For example, the digital calculation circuit 3521 can receive the first logic signal L1 output from the first calculator 351 as an upper bit, and the second logic signal L2 output therefrom as a lower bit.

The digital calculation circuit 3521 can generate digital data by combining the received upper bit and lower bit, and generate the selection signal SEL by performing the digital calculation processing with respect to the generated digital data. When a quantity of the logic signals L1 and L2 output from the first calculator 351 is two, the digital calculation circuit 3521 can be configured as a calculation circuit for processing binary data. However, the present embodiment is not limited thereto.

The source output enable signal selection circuit 3522 can output one among the source output enable signals SOE1 to SOE3 to the switching element SW based on the selection signal SEL. The source output enable signal selection circuit 3522 can be configured with a switching element for connecting one among the source output enable signals SOE1 to SOE3 to an output terminal, and the like.

For example, when the selection signal SEL has a first value, the source output enable signal selection circuit 3522 can output the first source output enable signal SOE1, when the selection signal SEL has a second value, the source output enable signal selection circuit 3522 can output the second source output enable signal SOE2, and when the selection signal SEL has a third value, the source output enable signal selection circuit 3522 can output the third source output enable signal SOE3.

In an embodiment of the present disclosure, the source output enable signal selection circuit 3522 can be configured to further receive a signal output from the first calculator 351, as illustrated in FIG. 12. For example, the source output enable signal selection circuit 3522 can be configured to further receive a logic signal output from the second XOR gate E. Here, the logic signal output from the second XOR gate E can show whether the turn-on levels of the mux control signals MUX1 to MUX3 overlap. In this embodiment, when the logic signal output from the second XOR gate E is a logic low signal, for example, when the turn-on levels of the mux control signals MUX1 to MUX3 do not overlap, the source output enable signal selection circuit 3522 can select and output the first source output enable signal SOE1 corresponding thereto, regardless of the selection signal SEL.

Each of the source output enable signals SOE1 to SOE3 can have a waveform corresponding to one among the operation modes of the switching element SW. For example, as illustrated in FIG. 13, the first source output enable source SOE1 has a waveform corresponding to the high-impedance mode, the second source output enable source SOE2 has a waveform corresponding to the driving mode or the high-impedance mode (the waveform in the illustrated embodiment corresponds to the driving mode), and the third source output enable source SOE3 has a waveform corresponding to the high-impedance mode.

In various embodiments of the present disclosure, the operation mode corresponding to each source output enable signal SOE1 to SOE3 can be selected randomly. In addition, while the data driver 30 (FIG. 1) is driven, the operation mode corresponding to each source output enable signal SOE1 to SOE3 can be fixed or varied. In an embodiment of the present disclosure, the operation mode corresponding to each source output enable signal SOE1 to SOE3 can be varied based on one or more sensing information and the like with respect to the display panel 50 (FIG. 1). The sensing information can be, for example, sensing information with respect to the sub-pixels SP (FIG. 1) disposed on the display panel, sensing information with respect to the output signals of the data driver 30, sensing information with respect to the panel noise, and the like. However, the present embodiment is not limited thereto.

FIGS. 14 to 17 are waveform diagrams illustrating examples of input/output signals of the calculator illustrated in FIGS. 11 and 12.

Regarding the calculator 35 illustrated in FIG. 11 or FIG. 12, the available input/output signals of the calculator 35 illustrated in FIGS. 14 to 17 expressed by a logical table are provided in Table 1.

TABLE 1

| Case | MUX1 | MUX2 | MUX3 | A | B | C | D | E | F | Overlapping state | SEL | SOE |
|---|---|---|---|---|---|---|---|---|---|---|---|---|
| 1 | 0 | 0 | 1 | 0 | 0 | 0 | 0 | 0 | 0 | None | 0 | SOE1 |
| 2 | 0 | 1 | 1 | 1 | 0 | 0 | 1 | 1 | 0 | MUX2, 3 | 2 | SOE2 |
| 3 | 1 | 1 | 1 | 0 | 0 | 1 | 1 | 1 | 1 | MUX1, 2, 3 | 3 | SOE3 |
| 4 | 1 | 1 | 0 | 0 | 0 | 1 | 1 | 0 | 0 | MUX1, 2 | 2 | SOE2 |
| 5 | 0 | 1 | 0 | 0 | 1 | 0 | 1 | 1 | 0 | None | 0 | SOE1 |
| 6 | 1 | 0 | 1 | 0 | 0 | 0 | 0 | 0 | 0 | MUX1, 3 | 2 | SOE2 |
| 7 | 1 | 0 | 0 | 1 | 1 | 1 | 0 | 1 | 0 | None | 0 | SOE3 |
| 8 | 0 | 0 | 0 | 0 | 0 | 0 | 0 | 0 | 0 | None | 0 | SOE1 |

As expressed in Table 1, the calculator 35 can control the operation mode of the switching element SW through the source output enable signals SOE1 to SOE3 according to the quantity of the mux control signals MUX1 to MUX3 of which the turn-on levels overlap. For example, the switching element SW can operate in the high-impedance mode in response to the first source output enable signal SOE1. In addition, the switching element SW can operate in the driving mode in response to the third source output enable signal SOE3. In addition, the switching element SW can operate in the high-impedance mode or the driving mode in response to the second source output enable signal SOE2.

Figure 18:
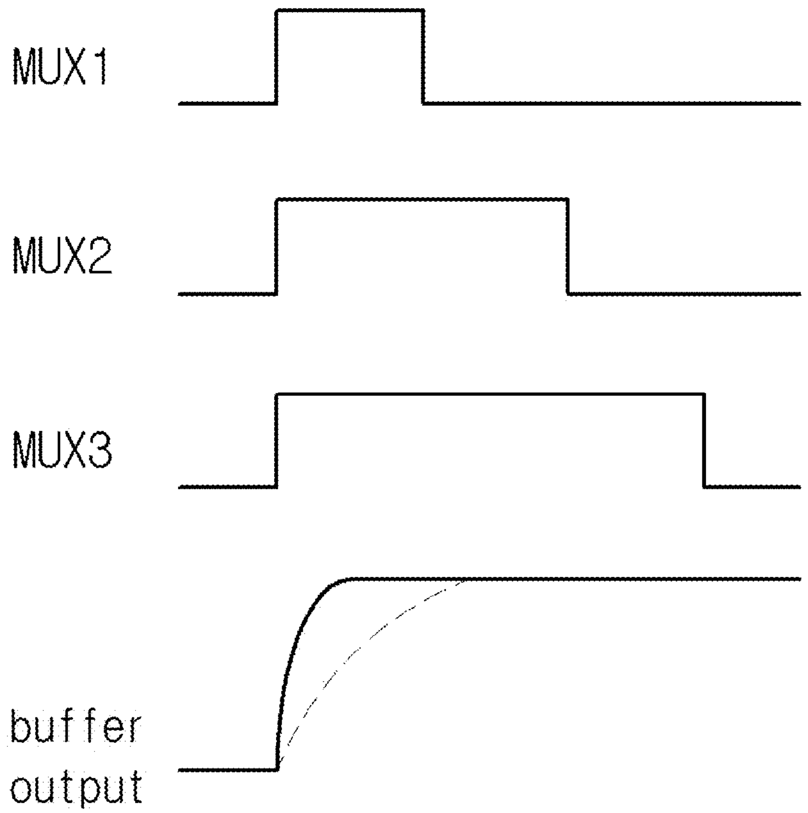
FIG. 18 is a graph illustrating an effect of improving a slew rate of an output buffer according to an embodiment of the present disclosure.

FIG. 18 is a graph illustrating an effect of improving the slew rate of the output buffer according to an embodiment of the present disclosure.

As described above, referring to FIG. 18, the switching element SW connected to the output buffer 34 can operate in the high-impedance mode or the driving mode according to the quantity of the overlap in an overlapping section of the mux control signals MUX1 to MUX3.

In an overlapping section at which all the mux control signals MUX1 to MUX3 overlap, the slew rate of the signal output from the output buffer 34 can be lowered by distortion among the output signals, however, because the output buffer 34 and the switching element SW operate in the driving mode in the above-described embodiment, the influence of the distortion on the slew rate of the signal output from the output buffer 34 is relieved, thereby the slew rate can be improved.

Figure 19:
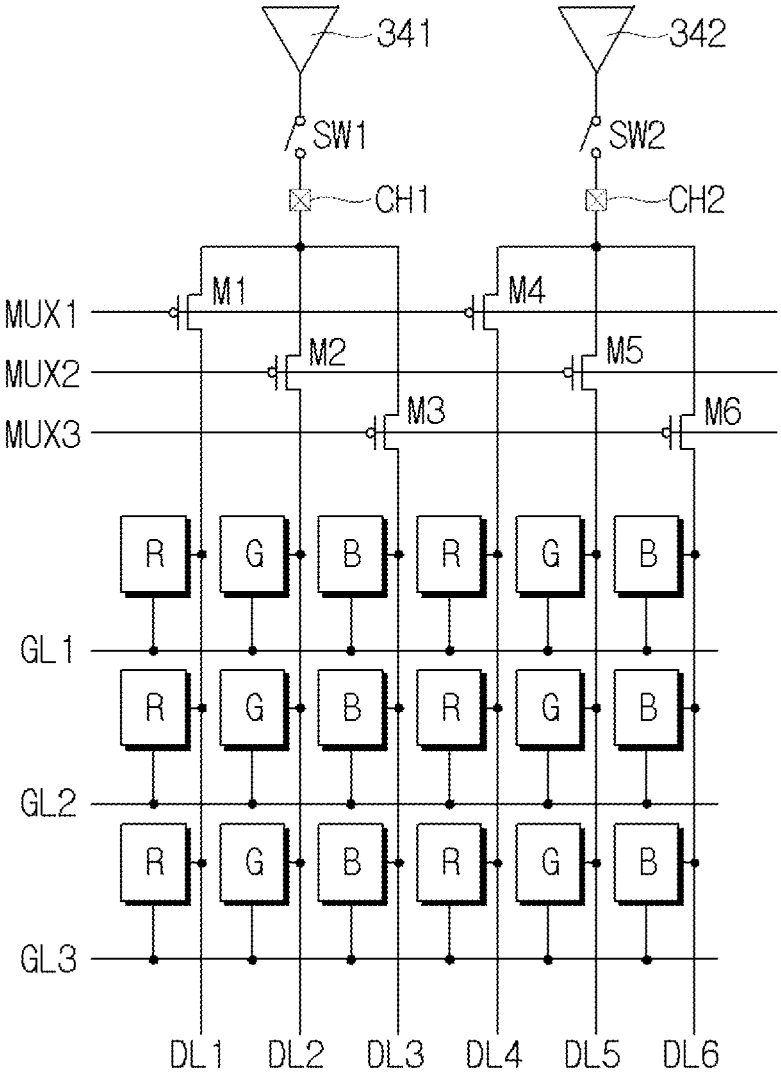
FIG. 19 is a block diagram illustrating a connection relationship between a data driver, a demultiplexer, and a display panel according to another embodiment of the present disclosure.

FIG. 19 is a block diagram illustrating a connection relationship between a data driver, a demultiplexer, and a display panel according to another embodiment of the present disclosure.

Referring to FIG. 19, in comparison with the embodiment in FIG. 7, the switching elements M1 to M6 of the demultiplexer 60 (FIG. 4) is configured as the pmos transistor. In this embodiment, the turn-on levels of the mux control signals MUX1 to MUX3 are set to be a low level.

Figure 20:
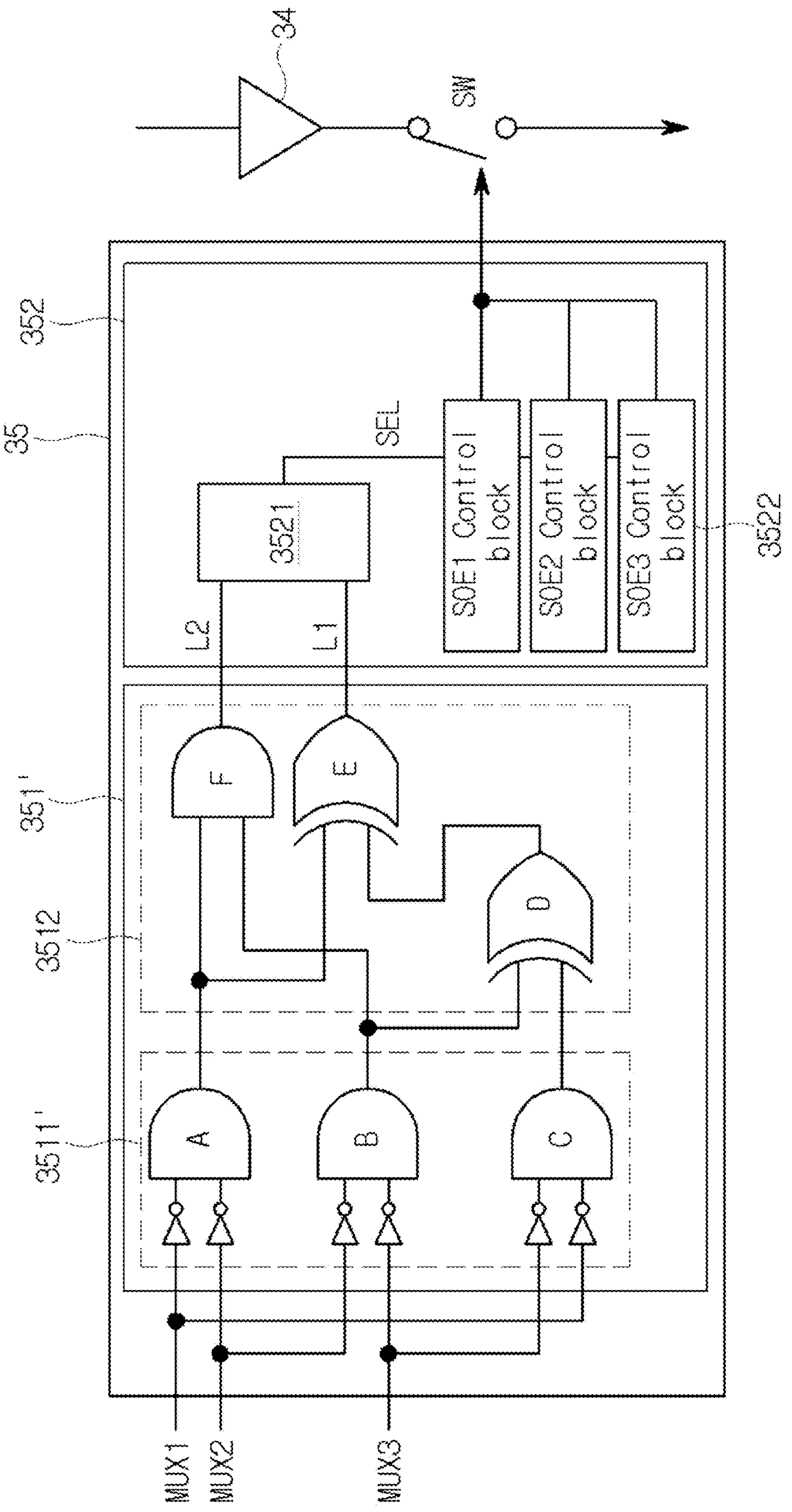
FIG. 20 is a block diagram illustrating a configuration of a calculator according to a third embodiment of the present disclosure.

FIG. 20 is a block diagram illustrating a configuration of a calculator according to a third embodiment of the present disclosure.

Referring to FIG. 20, in comparison with the embodiment in FIG. 11, a first logic gate group 3511' of a first calculator 351' further includes NOT gates, each of which is connected to a front end of the AND gates A, B, and C.

The NOT gates can invert a logic level of the mux control signals MUX1 to MUX3 and output the signals having the inverted logic level. For example, the NOT gate can receive each mux control signal MUX1 to MUX3, and when the received mux control signal MUX1 to MUX3 is a high level, the NOT gate can output a low level signal and when the received mux control signal MUX1 to MUX3 is a low level, the NOT gate can output a high level signal. The NOT gate can be provided in plural number so that all the mux control signals MUX1 to MUX3 can be inverted and output.

The embodiment in FIG. 20 allows the calculator 35 described referring to FIG. 11 to be substantially identically applied to the pmos demultiplexer 60 illustrated in FIG. 19. For example, the operation of the embodiment in FIG. 20 is substantially identical to that of the embodiment in FIG. 11 except addition of the NOT gates, therefore, the detailed description thereof will be omitted.

Figure 21:
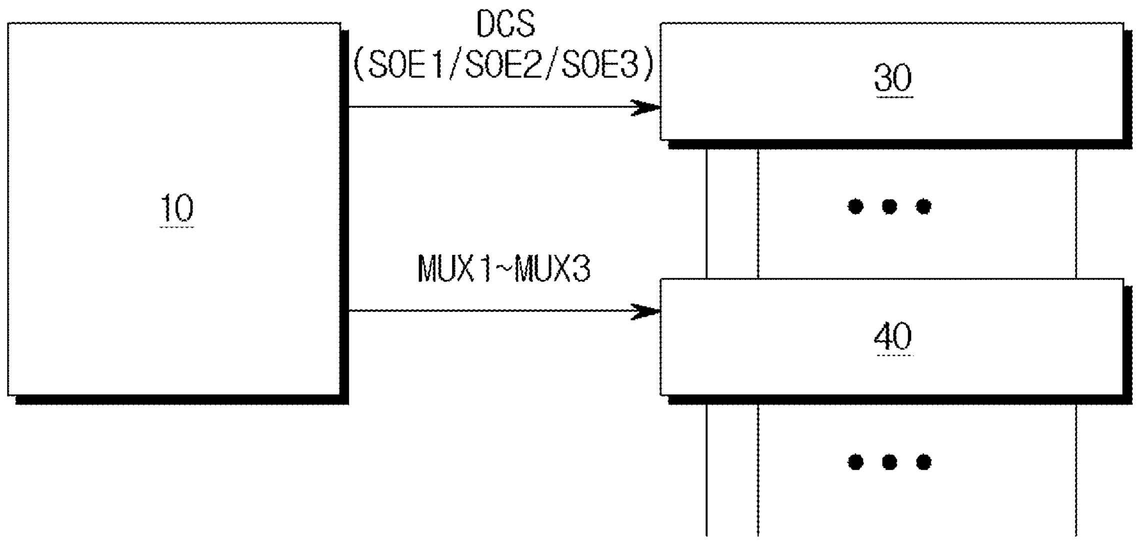
FIG. 21 is a diagram illustrating transmission/reception signals between a timing controller, a data driver, and a demultiplexer according to an embodiment of the present disclosure.

FIG. 21 is a diagram illustrating transmission/reception signals between the timing controller, the data driver, and the demultiplexer according to an embodiment of the present disclosure.

In the embodiment in FIG. 9, the data driver 30 can control the operation mode of the switching element SW through the internal calculator 35 based on the mux control signals MUX1 to MUX3 received from the timing controller 10.

However, in another embodiment of the present disclosure, the operation mode of the switching element SW can be directly instructed through the data control signal DCS applied from the timing controller 10 to the data driver 30.

In the embodiment, the timing controller 10 may not only transmit the mux control signals MUX1 to MUX3 to the demultiplexer 60, but also transmit the data control signal DCS including the source output enable signal SOE1 to SOE3 to the data driver 30 based on whether the turn-on periods of the mux control signals MUX1 to MUX3 overlap and the quantity of the overlap. In order to activate one among the plurality of source output enable signals SOE1 to SOE3 based on whether the turn-on periods of the mux signals MUX1 to MUX3 overlap and the quantity of the overlap, the timing controller 10 can allocate a corresponding bit of the data control signal DCS to an activated level (for example, a high level) and transmit the data control signal DCS to the data driver 30.

Referring to FIG. 21, the data control signal DCS can include information instructing start of the data control signal DCS, information instructing a starting position of RGB data, and information instructing a rising time of the source output enable signal and a pulse width, etc. In addition, the data control signal DCS can further include information controlling various functions implementable in the data driver 30.

The data control signal DCS can instruct the above-mentioned information using a low level or a high level. In an embodiment of the present disclosure, bits configuring a first control signal CTR1 of the data control signal DCS can correspond to information provided in Table 2.

TABLE 2

| Bit | CTR1 | Default | Update |
|---|---|---|---|
| 0 | CLKH | H | — |
| 1 | | H | — |
| 2 | GSP | L | Last Data |
| 3 | EQ1 | L | Last Data |
| 4 | EQ2 | L | |
| 5 | MODE1 | L | SOE Start |
| 6 | MODE2 | L | SOE Start |
| 7 | MODE3 | L | SOE Start |
| 8 | Reserved | L | — |
| 9 | INVC | L | SOE Start |
| 10 | PWRC1 | L | SOE Start |
| 11 | PWRC2 | L | |

In the first control signal CTR1 in Table 2, fifth to seventh bits are mode control signals for controlling the operation mode of the data driver 30, in more detail, the operation mode of the switching element SW. In an embodiment of the present disclosure, the switching element SW provided in the data driver 30 can operate in response to the source output enable signal SOE1 to SOE3 selected according to the mode control signal.

For example, while a fifth bit of the data control signal DCS is applied in a high level, the data driver 30 can operate according to the first source output enable signal SOE1 corresponding to a first mode. In addition, while a sixth bit of the data control signal DCS is applied in a high level, the data driver 30 can operate according to the second source output enable signal SOE2 corresponding to a second mode, and while a seventh bit of the data control signal DCS is applied in a high level, the data driver 30 can operate according to the third source output enable signal SOE3 corresponding to a third mode.

In an embodiment of the present disclosure, the operation mode of each of the source output enable signals SOE1 to SOE3 can be defined based on packet data of each of the mode control signals. For example, as defined in Table 3 below, it can be configured such that when the packet value is defined in a low level, the source output enable signal corresponding to the mode control signal implements the high-impedance mode, and when the packet value is defined in a high level, the source output enable signal corresponding to the mode control signal implements the driving mode.

TABLE 3

| MODE1/2/3 | Description |
|---|---|
| L | Hi-Z Mode |
| H | Driving Mode |

Those of ordinary skill in the art will recognize that the present disclosure can be embodied in other specific forms without departing from its spirit or essential characteristics. The described embodiments of the present disclosure are to be considered in all respects only as illustrative and not restrictive. The scope of the present disclosure is therefore indicated by the appended claims rather than by the foregoing description. All changes which come within meaning and range of equivalency of the claims are to be embraced within the scope of the present disclosure.

What is claimed is:

1. A display device, comprising:

a display panel on which a plurality of sub-pixels are arranged;

a data driver configured to provide a data voltage to the plurality of sub-pixels through a plurality of data lines; and a demultiplexer connected between the data driver and the plurality of data lines and configured with a plurality of switching elements controlled by a plurality of mux control signals, wherein the data driver includes:

an output buffer configured to output the data voltage and time-dividedly connected to the plurality of data lines;

a calculator configured to output a source output enable signal in correspondence with at least one among whether turn-on periods of the plurality of mux control signals overlap and a quantity of the overlap; and a buffer switching element connecting the output buffer and one of the plurality of data lines in response to the source output enable signal.

2. The display device of claim 1, wherein the buffer switching element operates in a driving mode or a high-impedance mode in response to the source output enable signal, and wherein the buffer switching element is controlled in the high-impedance mode when the turn-on periods of the plurality of mux control signals do not overlap, and wherein the buffer switching element is controlled in the driving mode when all the turn-on periods of the plurality of mux control signals overlap.

3. The display device of claim 2, wherein in the driving mode, the buffer switching element is controlled in a turn-on state when the data voltage is output from the output buffer, and wherein in the high-impedance mode, the buffer switching element is controlled in a turn-on state after a hold period elapses from a time point when the data voltage is output from the output buffer.

4. The display device of claim 2, wherein each source output enable signal is corresponding to an operation mode of the buffer switching element, the correspondence being varied based on one or more sensing information with respect to the display panel and the operation mode comprises the driving mode or the high-impedance mode.

5. The display device of claim 1, wherein the buffer switching element operates in a driving mode or a high-impedance mode in response to the source output enable signal, and wherein the buffer switching element is controlled in the high-impedance mode or the driving mode when a part of the turn-on periods of the plurality of mux control signals overlap.

6. The display device of claim 1, wherein the calculator includes:

a first calculator configured to perform a logic calculation with respect to the plurality of mux control signals and output a logic signal having a predetermined logic level; and a second calculator configured to select and output one of a plurality of source output enable signals in response to the logic signal.

7. The display device of claim 6, wherein the first calculator is configured to output the logic signal of n-bit corresponding to a quantity of the mux control signals in a turn-on level when at least two mux control signals among the plurality of mux control signals are in the turn-on level, where n is a natural number, and wherein the second calculator is configured to generate a selection signal through a digital calculation processing with respect to the logic signal of n-bit, and output one of the plurality of source output enable signals which corresponds to the selection signal.

8. The display device of claim 6, wherein the first calculator includes:

a first logic gate group configured to compare the plurality of mux control signals with one another sequentially, and output a logic high signal when all the compared mux control signals are in a high level; and a second logic gate group configured to output a first logic signal in a high level when at least one of the logic signals output from the first logic gate group is the logic high signal, and output a second logic signal in a high level of the logic high signal when at least two of the logic signals output from the first logic gate group are the logic high signals.

9. The display device of claim 8, wherein the first logic gate group includes:

an AND gate configured to receive two mux control signals among the plurality of mux control signals and output the logic high signal when all the two received mux control signals are in the high level, and wherein the second logic gate group includes:

a first XOR gate configured to receive two logic signals among logic signals output from the first logic gate group and output a logic signal in the high level when the received two logic signals have different logic levels;

a second XOR gate configured to receive the logic signal output from the first XOR gate and a logic signal other than the two logic signals among logic signals output from the first logic gate group, and output the first logic signal in the high level when the received two logic signals have different logic levels; and an AND gate configured to receive two logic signals among the logic signals output from the first logic gate group and output the second logic signal in a high level when the received two logic signals are the logic high signals.

10. The display device of claim 9, wherein the first logic gate group further includes:

a NOT gate configured to invert a logic level of the plurality of mux control signals and output the inverted signals.

11. The display device of claim 8, wherein the second calculator includes:

a digital calculation circuit configured to output a selection signal through digital calculation processing of the first logic signal and the second logic signal; and a source output enable signal selection circuit configured to output one of the plurality of source output enable signals in response to the selection signal.

12. The display device of claim 11, wherein the source output enable signal selection circuit is configured to further receive the first logic signal output from the second logic gate group.

13. A data driver, comprising:

a register unit configured to sample image data applied from an external device and output the image data;

a latch unit configured to latch the image data output from the register unit and output the image data in synchronization with a latch output control signal received from an external device;

a digital-to-analog converter configured to convert the image data output from the latch unit into a gamma compensation voltage and generate a data voltage;

an output buffer configured to output the data voltage received from the digital-to-analog converter and time-dividedly connected to a plurality of data lines;

a calculator configured to output a source output enable signal in correspondence with at least one among whether turn-on periods of a plurality of mux control signals received from an external device overlap and a quantity of the overlap; and a buffer switching element connecting the output buffer to one of the plurality of data lines in response to the source output enable signal.

14. The data driver of claim 13, wherein the calculator includes:

a first calculator configured to perform a logic calculation with respect to the plurality of mux control signals and output a logic signal having a predetermined logic level; and a second calculator configured to output one of a plurality of source output enable signals in response to the logic signal.

15. The data driver of claim 14, wherein the first calculator is configured to output the logic signal of n-bit corresponding to a quantity of the mux control signals in a turn-on level when at least two mux control signals among the plurality of mux control signals are in the turn-on level, where n is a natural number.

16. The data driver of claim 15, wherein the second calculator is configured to generate a selection signal through digital calculation processing with respect to the logic signal of n-bit, and select and output one of the plurality of source output enable signals which corresponds to the selection signal.

17. The data driver of claim 14, wherein the first calculator includes:

a first logic gate group configured to compare the plurality of mux control signals with one another sequentially and output a logic high signal when all the compared mux control signals are in a high level; and a second logic gate group configured to output a first logic signal in a high level when at least one of the logic signals output from the first logic gate group is the logic high signal, and output a second logic signal in a high level of a logic high signal when at least two of the logic signals output from the first logic gate group are the logic high signals, and wherein the second calculator includes:

a digital calculation circuit configured to output a selection signal through digital calculation processing of the first logic signal and the second logic signal; and a source output enable signal selection circuit configured to output one of the plurality of source output enable signals in response to the selection signal.

18. The data driver of claim 17, wherein the source output enable signal selection circuit is configured to further receive the first logic signal output from the second logic gate group.

19. A display device, comprising:

a display panel on which a plurality of sub-pixels are arranged;

a data driver configured to provide a data voltage to the plurality of sub-pixels through a plurality of data lines; and a demultiplexer connected between the data driver and the plurality of data lines and configured with a plurality of switching elements controlled by a plurality of mux control signals, a timing controller configured to provide the plurality of mux control signals to the demultiplexer; and determine source output enable signals based on at least one among whether turn-on periods of the plurality of mux control signals overlap and a quantity of the overlap, and provide a data control signal including the source output enable signals to the data driver, wherein the data driver includes:

an output buffer configured to output the data voltage and time-dividedly connected to the plurality of data lines; and a buffer switching element connecting the output buffer and the data line in response to the source output enable signals.

20. The display device of claim 19, wherein different bits of the digital control signal corresponding to respective source output enable signals.

* * * * *